United States Patent
Ciccone et al.

(10) Patent No.: US 12,330,359 B2
(45) Date of Patent: Jun. 17, 2025

(54) STACK MOLD CARRIER

(71) Applicant: TOP GRADE MOLDS LTD., Mississauga (CA)

(72) Inventors: Vincenzo Ciccone, Kleinburg (CA); Petrica Maran, Mississauga (CA)

(73) Assignee: Top Grade Molds Ltd., Mississauga (CA)

( * ) Notice: Subject to any disclaimer, the term of this patent is extended or adjusted under 35 U.S.C. 154(b) by 468 days.

(21) Appl. No.: 17/774,590

(22) PCT Filed: Nov. 5, 2020

(86) PCT No.: PCT/CA2020/051500
§ 371 (c)(1),
(2) Date: May 5, 2022

(87) PCT Pub. No.: WO2021/087609
PCT Pub. Date: May 14, 2021

(65) Prior Publication Data
US 2022/0396019 A1 Dec. 15, 2022

Related U.S. Application Data

(60) Provisional application No. 62/930,857, filed on Nov. 5, 2019.

(51) Int. Cl.
*B29C 45/32* (2006.01)
*B29C 45/26* (2006.01)

(52) U.S. Cl.
CPC .......... *B29C 45/32* (2013.01); *B29C 45/2602* (2013.01); *B29C 2045/326* (2013.01)

(58) Field of Classification Search
None
See application file for complete search history.

(56) References Cited

U.S. PATENT DOCUMENTS

| | | | |
|---|---|---|---|
| 6,155,811 A | 12/2000 | Looije et al. | |
| 6,503,075 B1 | 1/2003 | Schad et al. | |
| 7,125,247 B2 | 10/2006 | Glaesener et al. | |
| 7,665,984 B2 | 2/2010 | Teng | |
| 2006/0083803 A1* | 4/2006 | DiSimone | B29C 45/1756 425/190 |
| 2016/0107351 A1 | 4/2016 | Segal | |
| 2016/0303785 A1 | 10/2016 | Segal | |

* cited by examiner

Primary Examiner — Armand Melendez
(74) Attorney, Agent, or Firm — Smart & Biggar LP

(57) ABSTRACT

A stack mold carrier for supporting a center mold section of an injection molding machine, including a platen assembly, is disclosed. The stack mold carrier includes a carrier base which includes a mold support portion for coupling with and supporting the center mold section. A linkage assembly is pre-installed on the carrier base and a first restraint system is provided for releasably retaining the linkage assembly in a first, non-operational position wherein the linkage assembly is fixed relative to the carrier base such that the stack mold carrier can be disposed on the platen assembly as an assembled unit. The stack mold carrier includes a second restraint system for releasably retaining the stack mold carrier on the platen assembly prior to connection with the center mold section.

15 Claims, 19 Drawing Sheets

STACK MOLD CARRIER

CROSS-REFERENCE TO RELATED APPLICATION

This application claims the benefit of and priority to U.S. Provisional Patent Application No. 62/930,857 filed Nov. 5, 2019 under the title STACK MOLD CARRIER, the content of which is hereby expressly incorporated by reference into the detailed description hereof.

FIELD

The present disclosure relates generally to the field of injection molding, in particular, stack mold carriers for injection molds.

BACKGROUND

It is well known in the art of injection molding to use opposing faces of adjacent mold plates, one defining a cavity, the other including a mold core which mates with the cavity, creating a cavity therebetween. These plates are brought together and molten plastic is injected between adjacent mating plates. Mold plates are cooled to cause solidification of the plastic. The plates are then separated and the finished plastic article ejected.

In order to achieve high volume production, a stack mold is often used, wherein two or more sets of molds are interspersed in sequence in which rows of mold cores and mold cavities (often referred to as mold levels or mold sets) are stacked in a single machine. In conventional stack molds, typically, a central, first mold plate is provided, for holding the mold cavities of the respective stacks of molds. Typically, the central plate comprises two or more abutting plates, and is connected to cooling lines and the like for cooling of the injected molten plastic. Two outer, second mold plates are located on either side of the central plate, with the entire system opening and closing during the molding process. One of the outer, second mold plates is affixed to a stationary platen of a conventional injection mold, while the other outer mold plate is attached to the moveable platen. The other outer, second mold plate and the central first mold plate move, relative to the stationary platen during the opening and closing process of the mold.

Stack mold carriers for supporting the center mold plate or center mold section in the injection mold and that allow the mold plate to move along the machine tie bars and/or machine linear bearing or linear guideway, or linear ways, or any other known guiding mechanisms, are known. However, stack mold carriers can be difficult, and often time consuming, to install as they often include various components that require installation on and attachment to various parts of the injection mold. Complex installation requirements associated with stack mold carriers can also impose safety risks to workers involved with the installation, repair and or operation of the mold.

Access to the mold plates of an injection mold is also required, for various reasons, such as to perform stack mold maintenance, unexpected stack mold repair, insert changes on the mold, etc. Accordingly, a stack mold carrier that can be installed on the mold in a more efficient and safe manner, and that can remain installed on the machine while the stack mold is removed and/or changed, is desirable, to not only improve safety but to also to reduce non-operational time of the mold, while installation and maintenance is in effect, which may have overall economic costs to the mold owner

SUMMARY

According to an example embodiment of the present disclosure, there is provided a stack mold carrier for supporting a center mold section of and injection mold including a platen assembly of an injection molding machine. The stack mold carrier comprises: a carrier base for coupling with and supporting the center mold section, wherein the carrier base is configured for displacement relative to the platen assembly along a machine axis; a linkage assembly pivotally connected to the carrier base and configured for pivotally connecting to a first platen and to a second platen of the platen assembly; a first restraint system for releasably retaining the linkage assembly in a fixed position relative to the carrier base, the first restraint system defining: a first condition, wherein the linkage assembly is fixed relative to the carrier base such that pivotal movement of the linkage assembly relative to the carrier base is prevented; and a second condition wherein the linkage assembly is disposed for pivotal movement relative to the carrier base and is operably coupled to the first and second platens; and a lift support body for releasably coupling with a lifting mechanism, the lift support body supporting the stack mold carrier when subjected to a lifting force via the lifting mechanism, wherein: while the first restraint system is disposed in the first condition, the stack mold carrier is disposed for installation on the platen assembly as an assembled unit.

According to another example embodiment of the present disclosure, there is provided an injection molding machine, comprising: a machine guideway; a platen assembly mounted on the machine guideway, the platen assembly including: a first platen; a second platen; a pair of upper and lower tie bars interconnecting the first and second platens, wherein the first platen is disposed for displacement along the upper and lower tie bars relative to the second platen; a drive mechanism for displacing the first platen relative to the second platen; a stack mold carrier disposed, independently, on either side of the platen assembly for supporting a center mold section of an injection mold, each stack mold carrier comprising: a carrier base for coupling with and supporting the center mold section, wherein the carrier base is configured for displacement relative to the upper and lower ties bars along a machine axis; a linkage assembly pivotally connected to the carrier base and for pivotally connecting to the first platen and to the second platen; a first restraint system for releasably retaining the linkage assembly in a fixed position relative to the carrier base, the first restraint system defining: a first condition, wherein the linkage assembly is fixed relative to the carrier base such that pivotal movement of the linkage assembly relative to the carrier base is prevented; and a second condition wherein the linkage assembly is disposed for pivotal movement relative to the carrier base and relative to the first and second platens; wherein: while the first restraint system is disposed in the first condition, the stack mold carrier is disposed for installation on the platen assembly as an assembled unit.

According to another aspect of the present disclosure, there is provided a method for installing a stack mold carrier on an injection molding machine including a platen assembly having a machine guideway, a first platen, a second platen and upper and lower tie bars interconnecting the first and second platens, comprising the steps of: (i) providing a stack mold carrier comprising: a carrier base for coupling with and supporting a center mold section, wherein the carrier base is configured for displacement relative to the platen assembly along a machine axis; a linkage assembly including: a propeller bar pivotally connected to the carrier base; a first link arm pivotally connected to a first end of the propeller bar, the first link arm configured for operably coupling to the first platen such that the first link arm pivots relative to the first platen in response to displacement of the first platen, relative to the second platen; and a second link arm pivotally connected to a second end of the propeller bar, the second link arm configured for operably coupling to the second platen such that the second link arm pivots relative to the second platen in response to displacement of the first platen, relative to the second platen; a first restraint system for releasably retaining the propeller bar in a fixed position relative to the carrier base, the first link arm in a fixed position relative to the propeller bar, and the second link arm in a fixed position relative to the propeller bar; a lift support body for releasably coupling with a lifting mechanism, the lift support body supporting the stack mold carrier when subjected to a lifting force via the lifting mechanism; and a second restraint system for releasably coupling the stack mold carrier relative to at least the upper tie bar of the platen assembly; (ii) installing a first mounting bracket on the first platen proximal a first one of the lower tie bars and a second mounting bracket on the second platen proximal a first one of the upper tie bars that is disposed generally parallel to the lower tie bar associated with the first mounting bracket such that the first and second mounting brackets are disposed on the same side of the platen assembly; (iii) while the first restraint system is activated such that the propeller bar is fixed relative to the carrier base, the first link arm is fixed relative to the propeller bar, and the second link arm is fixed relative to the propeller bar, releasably coupling a lifting mechanism to the lift support body of the stack mold carrier and lifting the stack mold carrier, as an assembled unit, and disposing the stack mold carrier on the machine guideway on one side of the platen assembly in close proximity to the upper and lower tie bars disposed on the one side of the platen assembly having the first and second mounting brackets; (iv) activating the carrier restraint system for releasably coupling the stack mold carrier relative to the upper tie bar of the platen assembly; (v) releasing the first link arm from the first restraint system such that it pivots relative to the propeller bar, and pivotally connecting the first link arm to the first platen via the first mounting bracket; (vi) releasing the second link arm from the first restraint system such that it pivots relative to the propeller bar, and pivotally connecting the second link arm to the second platen via the second mounting bracket; and (vii) releasing the propeller bar from the first restraint system such that it pivots relative to the carrier base.

According to another example embodiment of the present disclosure, there is provided a stack mold carrier comprising: a carrier base for releasably coupling with a center mold section of an injection mold, wherein the carrier base is configured for disposition on a machine guideway of a platen assembly of an injection molding machine and for releasable coupling relative to the platen assembly, such that the carrier base is configured for displacement, relative to the platen assembly, along the machine guideway; a linkage assembly pivotally connected to the carrier base and configured for pivotally connecting to a first platen and to a second platen of the platen assembly, wherein the linkage assembly defines: a first condition, wherein the linkage assembly is fixed relative to the carrier base such that pivotal movement of the linkage assembly relative to the carrier base is prevented; and a second condition wherein the linkage assembly is disposed for pivotal movement relative to the carrier base and is operably coupled to the first and second platens and disposed for pivotal movement relative to the first and second platens; and a tilt-impeding member coupled to the carrier base, the tilt-impeding member including an upper tie-bar engaging portion configured for disposition in opposition to and proximal at least a portion of an upper tie bar of the platen assembly; wherein: while the stack mold carrier is disposed on the machine guideway on one side of the platen assembly of the injection mold of the injection molding machine proximal corresponding upper and lower tie bars on the one side of the platen assembly, the tilt-impeding member is disposed generally parallel to and spaced apart from the corresponding upper tie bar of the platen assembly such that the upper tie-bar engaging portion is disposed in close proximity with the portion of the upper tie bar such that: the tilt-impeding member impedes displacement of the stack mold carrier about an axis that extends generally transverse to the vertical axis of the stack mold carrier such that displacement of the carrier base away from and out of engagement with the machine guideway is prevented.

BRIEF DESCRIPTION OF THE DRAWINGS

Reference will now be made, by way of example, to the accompanying drawings which show an example embodiment of the present application, and in which:

FIG. 5A is a detail view of the encircled area 5A of FIG. 5;

Similar reference numerals may have been used in different figures to denote similar components.

DESCRIPTION OF EXAMPLE EMBODIMENTS

Figure 1:
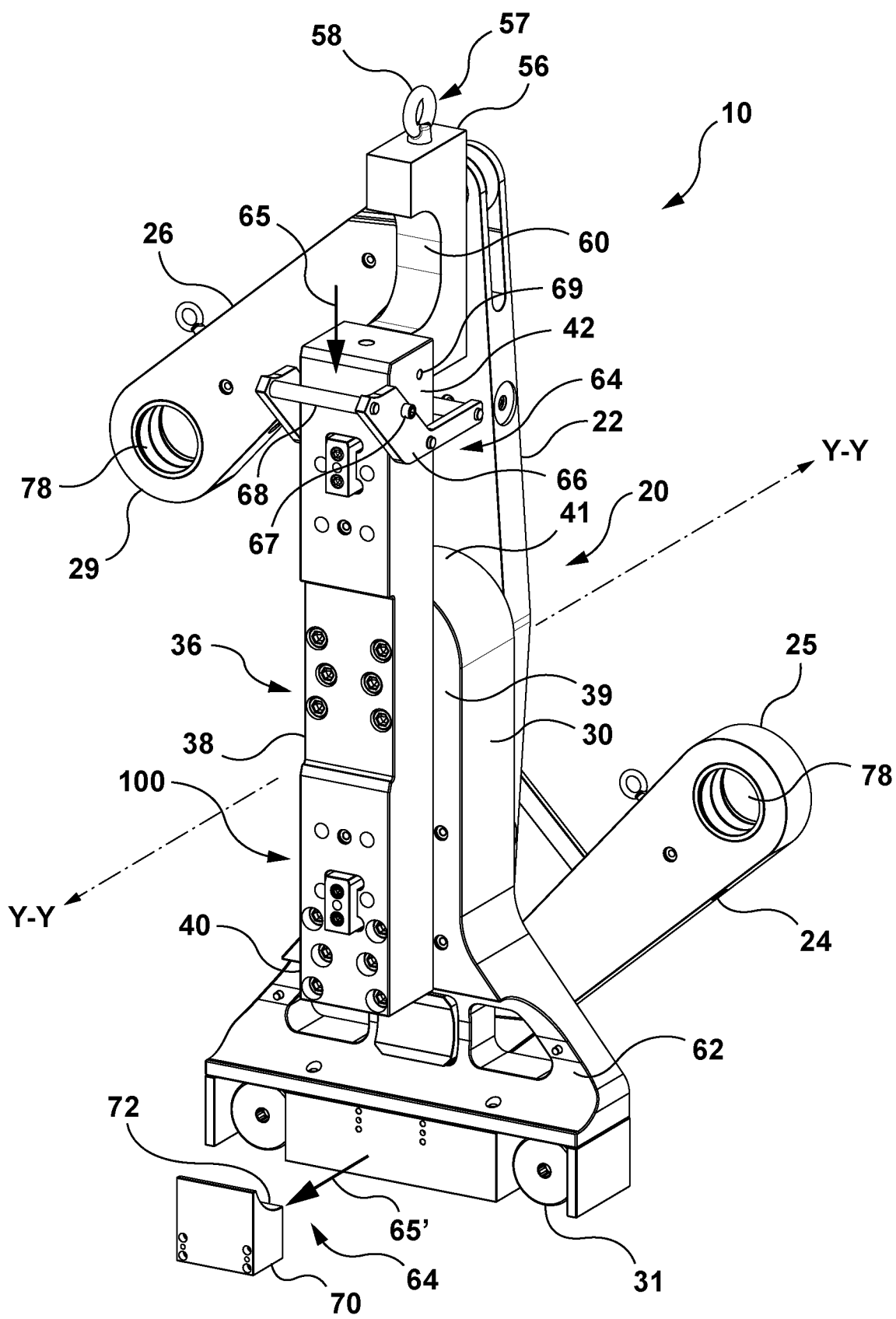
FIG. 1 is a perspective view of stack mold carrier according to an example embodiment of the present disclosure.

Referring now to FIG. 1, there is shown a stack mold carrier 10 according to an example embodiment of the present disclosure. The stack mold carrier 10 is configured for mounting to a platen assembly 12 of an injection molding machine and is configured to support the molds, or center mold section, of the injection mold.

Figure 2:
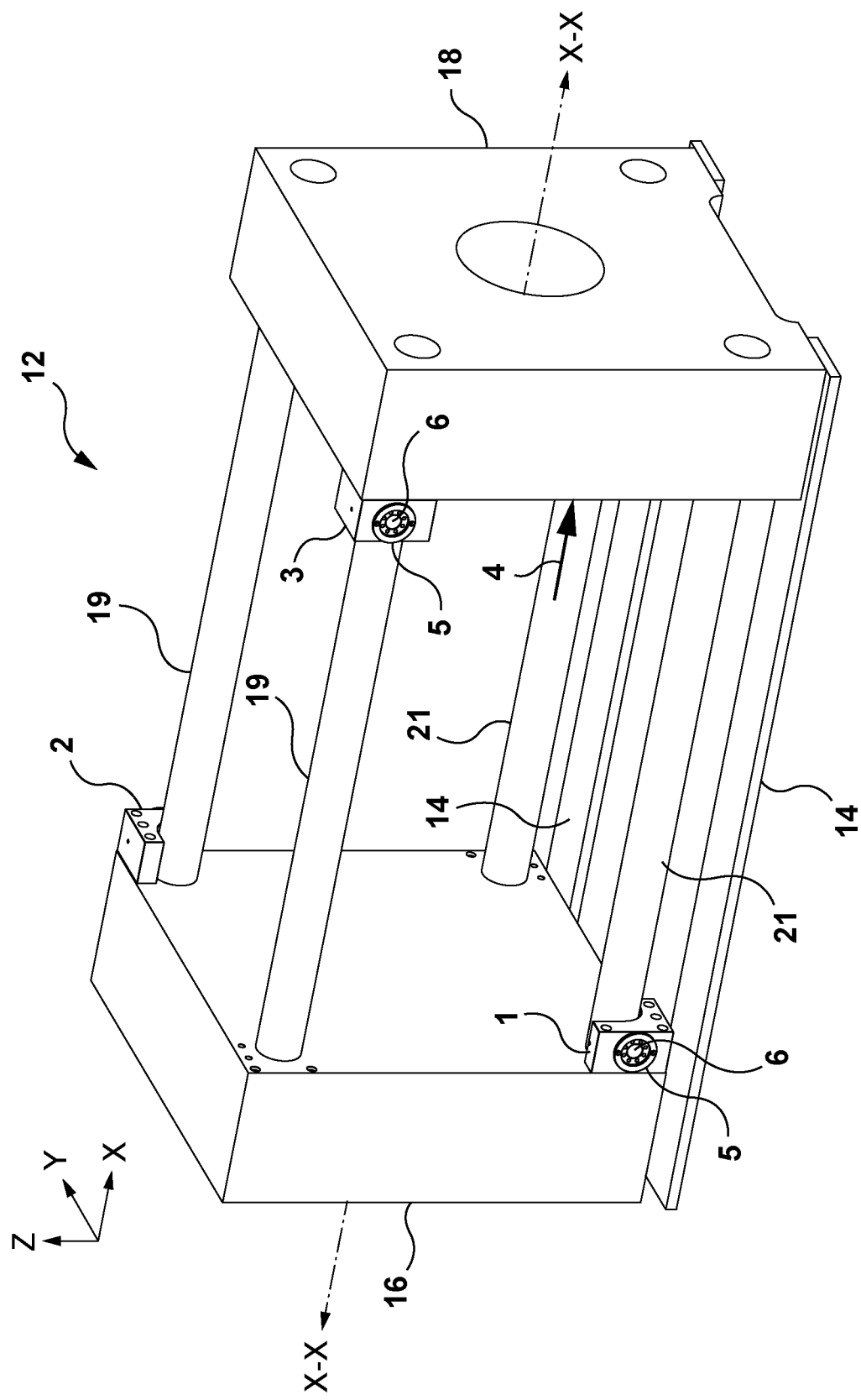
FIG. 2 is a perspective view of an example embodiment of a platen assembly for an injection molding machine that is configured for cooperating with the stack mold carrier of FIG. 1.

An example embodiment of a platen assembly 12 is shown in FIG. 2. As shown, the platen assembly 12 includes a machine guideway 14 and first and second platens 16, 18. In some embodiments, for example, the machine guideway 14 includes, but is not limited to, linear guideways for cooperating with rollers, linear guideways with bronze pads, adaptors for cooperating with linear guideways or linear bearing guideways, linear bearing guideways, linear ways, or tie bar supports. Accordingly, the platen assembly 12 may include any suitable guiding mechanism for support and guiding displacement of the moveable platens, along the machine axis, during mold opening and closing procedures. Accordingly, it will be understood that reference to machine guideway 14 is intended to include any suitable guiding mechanism known in the art for guiding displacement or reciprocating movement of the platens 16, 18 of the platen assembly 12.

Referring, in particular to the example embodiment of FIG. 2, the first platen 16 is a moveable platen while the second platen 18 is a fixed platen. In the subject example embodiment, the first and second platens 16, 18 are each mounted, independently, on sets or pairs of upper and lower tie bars 19, 21. The first, moveable platen 16 is mounted on the upper and lower tie bars 19, 21 such that it translates along the tie bars 19, 21, guided by the tie bars and the machine guideway 14, relative to the second, fixed platen 18, along the machine axis X-X, as illustrated schematically in FIG. 2. Displacement of the first, moveable platen 16 along the tie bars 19, 21 and machine guideway 14, in a reciprocating manner relative to the second platen 18, defines the open and closed positions of the mold (or molds).

In some embodiments, for example, a center mold section (not shown), is disposed between the first and second platens 16, 18 and is typically configured for carrying mold plates (not shown) on either side thereof. A corresponding mold plate (not shown) is mounted on or fixed or otherwise coupled to the first platen 16, which mold plate is complementary to the corresponding mold plate disposed on the corresponding side of the center mold section. Similarly, a mold plate (not shown) is also mounted on or fixed to the second platen 18, which mold plate is complementary to the corresponding mold plate disposed on the corresponding side of the center mold section. In some embodiments, for example, a plurality of mold plates are installed between the first and second platens 16, 18, with each pair of complementary mold plates defining a mold cavity therebetween when the corresponding mold plates are disposed in their closed position. Accordingly, in some embodiments, the plurality of mold plates, the center mold section and the first and second platens 16, 18 are cooperatively configured to define a plurality of mold cavities between the first and second platens 16, 18. In use, molten material is injected into the plurality of mold cavities to form molded articles, which articles are released from the mold cavities upon opening of the molds.

In general, the injection molding machine includes a driver or drive mechanism (not shown) that operates to move the first, or moveable, platen 16 relative to the second platen 18 so as to define the open and closed mold positions. In use, the first, movable platen 16 reciprocates along the fixed tie bars 19, 21, between the open and closed positions in accordance with principles known in the art. As the first, moveable platen 16 translates between the open and closed positions to open and close the mold, the center mold section (not shown), which also carries mold plates, must also move, relative to the first and second platens 16, 18, in order to open and close the various mold cavities defined, in part, by the center mold section.

A stack mold carrier 10 is configured to be installed on the platen assembly 12 for supporting the center mold section (or plurality of mold plates) and for co-operating with the first and second platens 16, 18 to define the one or more mold cavities. The stack mold carrier 10 serves to move the center mold section relative to the first and second platens 16, 18, in conjunction with displacement of the first, movable platen 16 relative to the second, or fixed, platen 18 for defining the open and closed mold positions.

In the subject example embodiment, the stack mold carrier 10 includes a carrier base 100 and a linkage assembly 20, mounted on the carrier base 100, for operably connecting the stack mold carrier 10 to the first and second platens 16, 18 of the platen assembly 12 of the injection mold. The operable connection between the linkage assembly 20 and the first and second platens allows the stack mold carrier 10 to translate relative to the movement of the first, moveable platen 16. In some embodiments, for example, the stack mold carrier is provided such that the linkage assembly 20 is pre-installed on the carrier base 100, which facilitates installation of the stack mold carrier within the mold.

In some embodiments, the carrier base 100 is comprised of modular components that are cooperatively configured to define the carrier base for supporting the center mold section. In some embodiments, the stack mold carrier 10 itself is modular in that it is made up of separate components and/or systems that are cooperatively arranged to give rise to the stack mold carrier 10 described herein.

The linkage assembly 20 includes a propeller bar 22 pivotally connected to the carrier base 100. A first link arm 24 is pivotally connected, at a first end 23 thereof, to a first end 32 of the propeller bar 22, the first link arm 24 having a second, distal end 25 configured for pivotally connecting or coupling to the first platen 16. In some embodiments, for example, the first link arm 24 is pivotally connected or coupled to the first platen 16 via a mounting block or bracket 1 that is fixed to the platen 16. In other embodiments, there may be a direct connection or direct coupling between the first link arm 24 and the first platen 16. A second link arm 26 is pivotally connected, at a first end 27 thereof, to a second end 34 of the propeller bar 22, the second link arm 26 having a second, distal end 29 configured for pivotally connecting or coupling to the second platen 18. In some embodiments, for example, the second link arm 26 is pivotally connected or coupled to the second platen 18 via a mounting block or mounting bracket 3 that is fixed to the platen 18. In other embodiments, there may be a direct connection or direct coupling between the first link arm 24 and the second platen 18. In some embodiments, for example, the linkage assembly 20 includes a harmonic arm linkage assembly.

The carrier base 100 supports the stack mold carrier 10 on the machine guideway 14 of the platen assembly 12 of the injection molding machine. In some embodiments, for example, the carrier base 100 includes rollers 31 which allow displacement of the stack mold carrier 10 along the guideway 14 of the platen assembly 12, while in use. While rollers 31 are shown, it will be understood that the engagement between the carrier base 100 and the linear or machine guideway 14 of the platen assembly 12, and the manner in which displacement of the carrier base 100 of the stack mold carrier 10 along the machine guideway 14 is effected, may be in accordance with any suitable means known in the art and that the stack mold carrier 10 should not be limited to rollers. In some embodiments, for example, the carrier base 100 may include bearing pads disposed for sliding movement relative to the machine guideway 14. In some embodiments, for example, the bearing pads may include bronze, brass, or Nylon bearing pads or any low friction alloy composite. In other embodiments, for example, the carrier base 100 of the stack mold carrier 10 may include adapters for mounting to the linear guideways or linear bearing guideways instead of rollers or bearing pads for effecting engagement between the stack mold carrier 10 and the machine guideway 14.

The stack mold carrier 10 includes a mold support portion 36 configured for receiving and/or connecting or coupling to the center mold section (not shown). In some embodiments, for example, the mold support portion 36 is mounted to the carrier base 100. In some embodiments, for example, the mold support portion 36 is integral with the carrier base 100. In other embodiments, for example, the carrier base 100 includes a base portion 30 and a separate mold support portion 36 that is fixed to the base portion 30 of the stack mold carrier 10. The center mold section (not shown) may be connected to the mold support portion 36 of the stack mold carrier 10 by any suitable means known in the art such that the center mold section translates with the carrier base 100 or base portion 30 of the stack mold carrier 10, along the machine guideway 14, as will be described in further detail below in connection with the operation of the stack mold carrier 10 and platen assembly 12. In some embodiments, for example, the mold support portion 36 includes a center mold section connector 37 configured for releasably connecting with the center mold section (not shown). In some embodiments, for example, the center mold section connector 37 includes receivers for coupling with corresponding threaded members (not shown) to secure the center mold section to the carrier base 100 or base portion 30 of the stack mold carrier 10.

In some embodiments, for example, as illustrated in the example embodiment of FIG. 1, the mold support portion 36 includes a mold support bar 38 that is mounted on and secured to the base portion 30 of the stack mold carrier 10 such that it is disposed generally opposite to the linkage assembly 20. Accordingly, in some embodiments, for example, the mold support bar 38 is fixed to an inner surface 39 of the base portion 30, while the linkage assembly 20 is disposed on an outer surface 43 of the base portion 30 that is generally opposite to the inner surface 39. In the subject example embodiment, the mold support bar 38 extends generally longitudinally between first and second ends 40, 42 and is mounted to the base portion 30 such that it is oriented along an axis z-z that is generally perpendicular to the machine axis x-x such that the mold support bar 38 is oriented generally orthogonal relative to the machine axis x-x or machine guideway 14. In the subject example embodiment, the mold support bar 38 and the base portion 30 are cooperatively configured such that the second end 42 of the mold support bar 38 is disposed beyond an upper end 41 of the base portion 30. In some embodiments, the center mold section connector 37 is disposed between the first and second ends 40, 42 of the mold support bar and is integral with the mold support bar 38 such that the mold support bar 38 and the center mold section connector 37 are of unitary one-piece construction.

Figure 4:
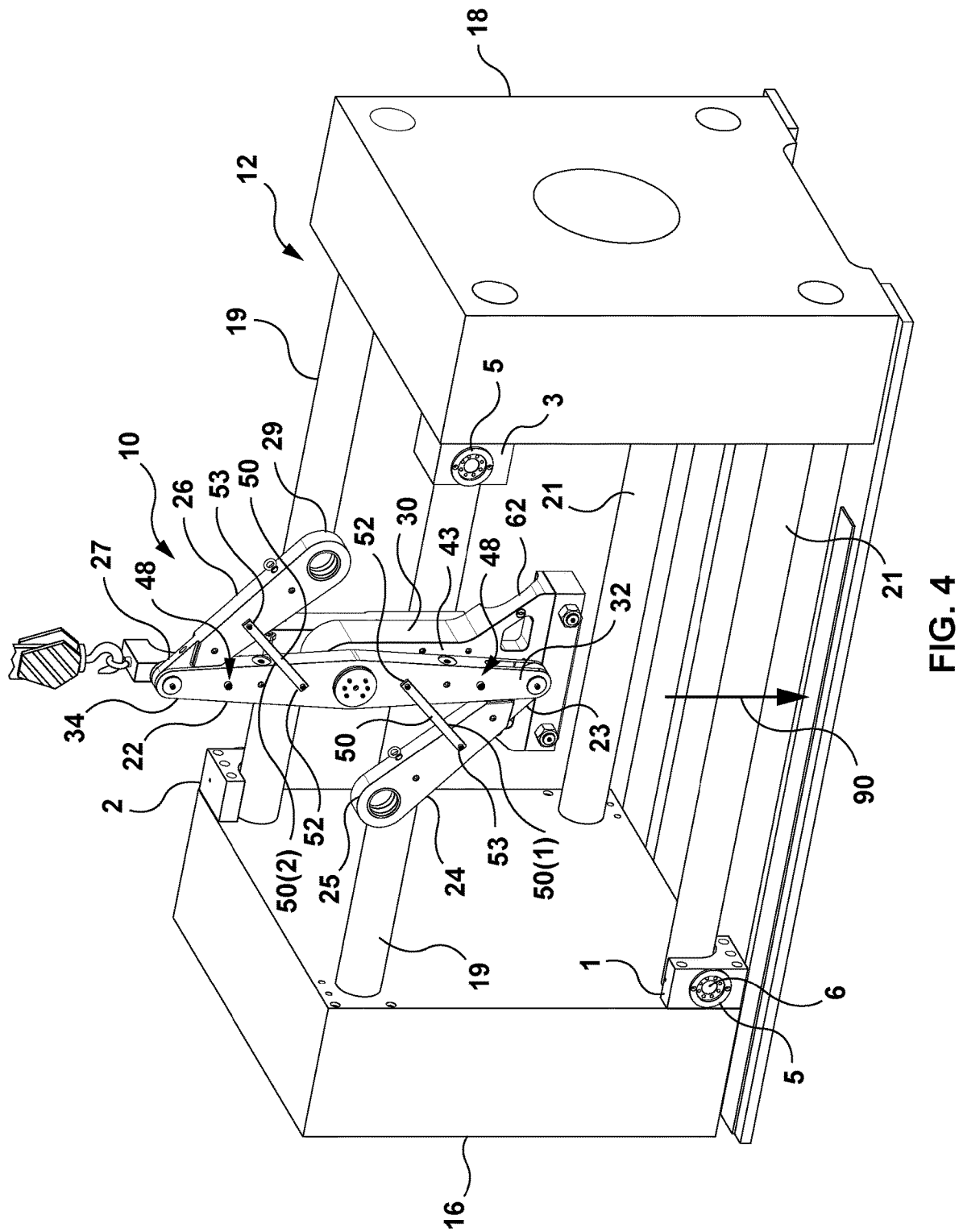
FIG. 4 is an assembly view of the stack mold carrier of FIG. 1 being installed on the platen assembly of FIG. 2.
Figure 5:
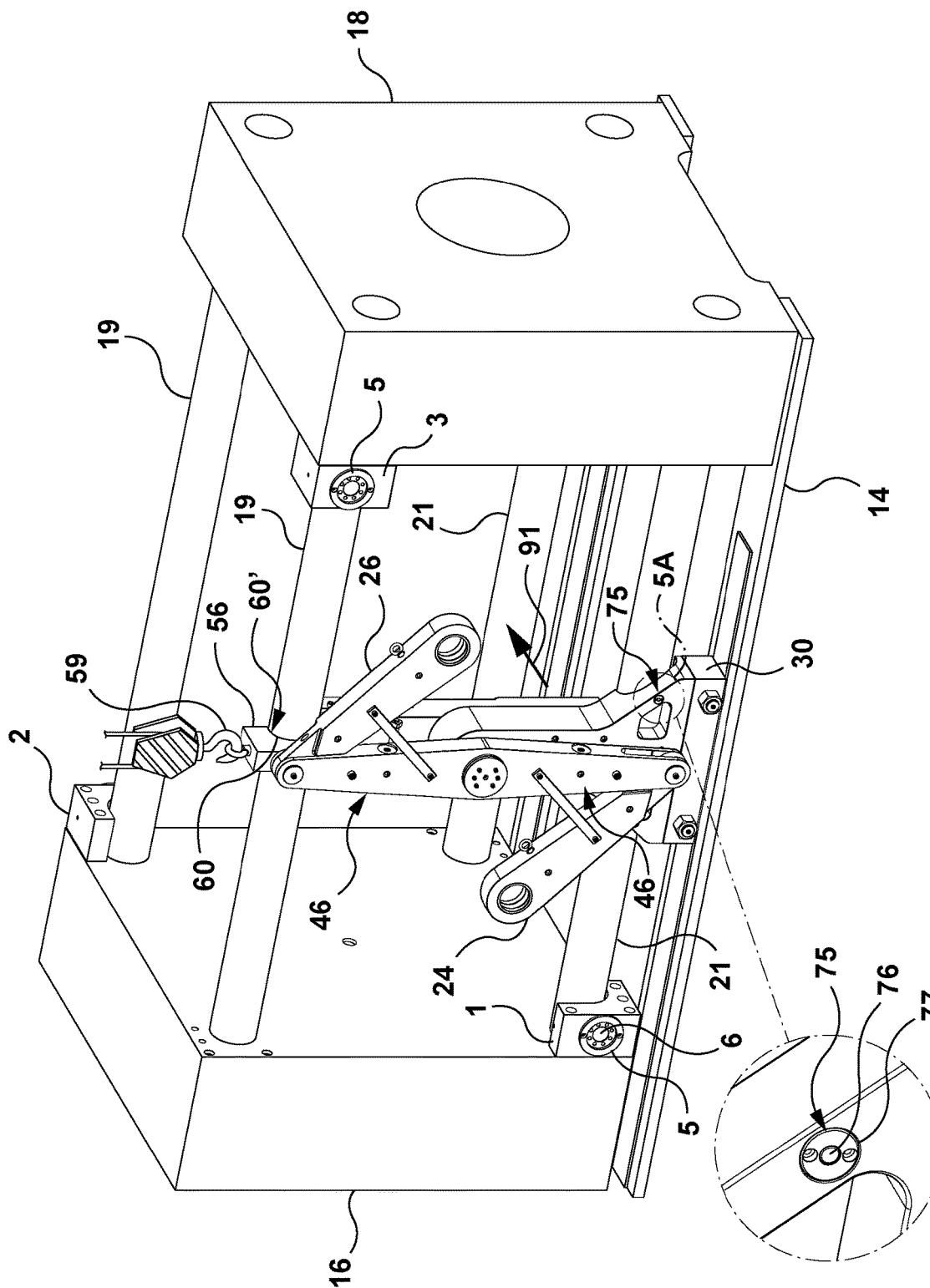
FIG. 5 is a perspective, front view of the stack mold carrier disposed on the platen assembly.

In order to facilitate installation and removal of the stack mold carrier 10 on and off of the platen assembly 12 of the injection molding machine, the stack mold carrier 10 includes a propeller restraint system 46 for retaining the linkage assembly 20 in a first, non-operational, position wherein the linkage assembly 20 is fixed relative to the carrier base 100 or base portion 30, the first, non-operational position of the linkage assembly 20, thereby defining a first condition of the stack mold carrier 10. Accordingly, while the linkage assembly 20 is disposed in the first, non-operational position, illustrated for example in FIGS. 1, 4 and 5, the propeller bar 22 is fixed relative to the carrier base 100 or base portion 30, and the first and second link arms 24, 26 are fixed relative to the propeller bar 22 such that pivotal movement of the propeller bar 22 relative to the base portion 30 and pivotal movement of the first and second link arms 24, 26 relative to the propeller bar 22 is prevented, or substantially prevented.

Figure 14:
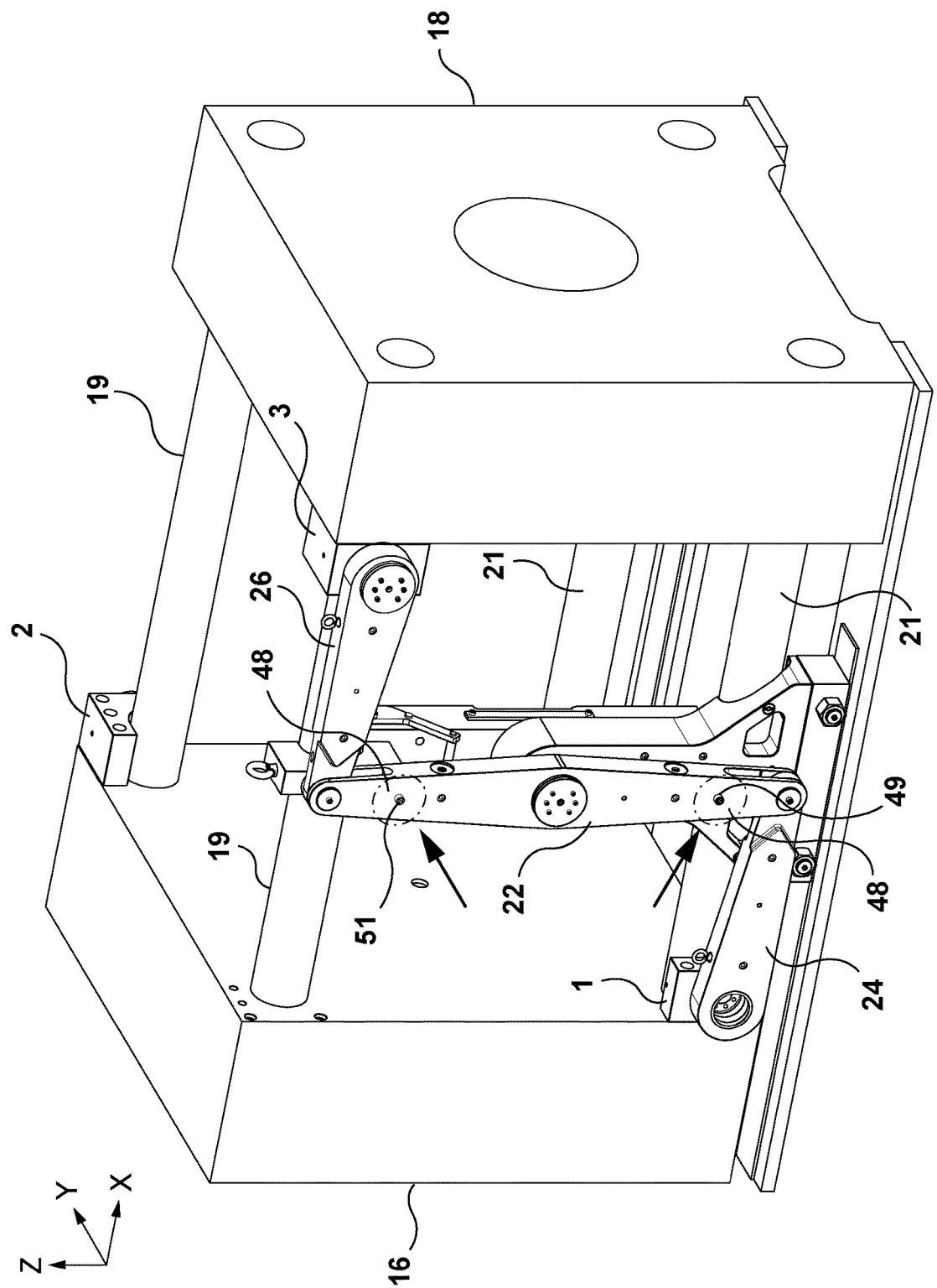
FIG. 14 is a front, perspective view of the stack mold carrier installed on the platen assembly.

In some embodiments, for example, the propeller restraint system 46 includes removable or releasable propeller restraints 48 for releasably retaining the propeller bar 22 in its first, non-operational position. In some embodiments, for example, the propeller restraints 48 include locking bolts that extend through corresponding bores disposed in the propeller bar 22 and base portion 30 of the stack mold carrier 10 such that the propeller bar 22 remains disposed in an upright or substantially vertical or perpendicular position, relative to the mold axis x-x. In the example embodiment, illustrated in FIG. 14, the propeller restraints 48 include a first locking bolt 49 that extends through a corresponding bore disposed in the propeller bar 22 and base portion 30 for securing the lower portion of the propeller bar 22 against the base portion 30, and a second locking bolt 51 that extends through a corresponding bore disposed in the propeller bar 22 and lift support body 56 of the stack mold carrier 10 for securing the upper portion of the propeller bar 22 in a fixed, upright position relative to the stack mold carrier 10.

The propeller restraint system 46 further includes latch bars 50 for releasably retaining the first and second link arms 24, 26, respectively, in their fixed position relative to the propeller bar 22. Accordingly, in some embodiments, for example, a first latch bar 50(1) releasably retains the first link arm 24 in a fixed position relative to the propeller bar 22, the first latch bar 50(1) having a first end 52 releasable connected to the propeller bar 22 and a second end 53 releasably connected to the first link arm 24 such that pivotal movement of the first link arm 24 relative to the propeller bar 22 is prevented. Similarly, a second latch bar 50(2) releasably retains the second link arm 26 in a fixed position relative to the propeller bar 22, the second latch bar 50(2) having a first end 52 releasably connected to the propeller bar 22 and a second end 53 releasably connected to the second link arm 26 such that pivotal movement of the second link arm 26 relative to the propeller bar 22 is prevented.

With the linkage assembly 20 disposed in its fixed, non-operational position, the stack mold carrier 10 can be lifted, as a unit, by any suitable means, for instance by means of a moveable crane arm, and disposed in position on the guideway 14 on one side of the platen assembly 12. Similarly, a second stack mold carrier 10 can be lifted, as a unit, and disposed in position on the machine guideway 14 on the opposite side of the platen assembly 12. The lifting of the stack mold carrier 10 as a complete unit with the linkage assembly 20 already disposed on the base portion 30, but restrained in its fixed, non-operational position, facilitates the installation (and/or removal) of the stack mold carrier 10 relative to the platen assembly 12 since the stack mold carrier 10 can be stored, carried and disposed relative to the platen assembly 12 as a single unit without having to separately install a base portion, a mold support and the various components of a linkage assembly, for example.

Figure 3:
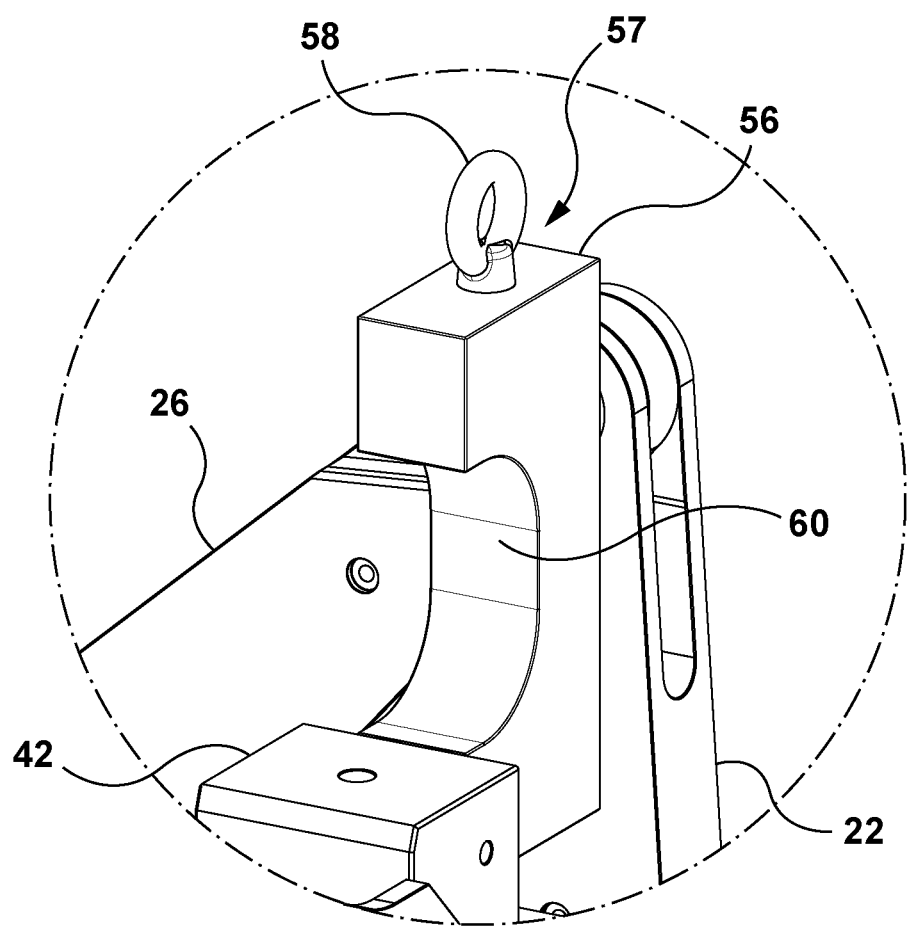
FIG. 3 is a detail view of portion of the stack mold carrier of FIG. 1.

Referring now to FIGS. 1 and 3, in some embodiments, for example, the stack mold carrier 10 includes a lift support body 56 configured for supporting the stack mold carrier 10 while the stack mold carrier 10 is subject to a lifting force, for example from a moveable crane, for displacement of the stack mold carrier 10 relative to the platen assembly 12 of the injection molding machine to facilitate installation of the stack mold carrier 10 relative to the platen assembly 12. The lift support body 56 is cooperatively configured together with the carrier base 100, or together with the base portion 30 and the mold support bar 38, such that the lift support body 56 supports the weight of the stack mold carrier 10 when the stack mold carrier 10 is subject to a lifting load. Accordingly, in some embodiments, the lift support body 56 includes a lifting mechanism coupler 57 configured for coupling with the lifting mechanism to apply the lift force to the stack mold carrier. Disposition of the lift support body 56 and the lifting mechanism coupler 57 at the top end of the stack mold carrier 10 is such that the center of gravity of the stack mold carrier 10 is aligned with the lift point defined by the lifting mechanism coupler 57 where the lifting force or lifting load is applied. By having the stack mold carrier 10 configured such that the lifting mechanism coupler 57 defines a lift point at the center of gravity or aligned with the center of gravity of the stack mold carrier lift point renders the stack mold carrier 10 less prone to tipping over during installation as the lift support body 56 and lifting mechanism coupler 57 ensures plumb lifting of the stack mold carrier 10. More specifically, by having the lift point or lifting mechanism coupler 57 configured such that it is parallel to and/or vertically aligned with the vertical axis (axis z-z) of the stack mold carrier 10 and configured in a vertical orientation is such that the assembled stack mold carrier 10 remains in a vertical orientation as it is lifted and positioned relative to the platen assembly 12. Accordingly, the lift support body 56 and the lifting mechanism coupler 57 are engineered to achieve a plumb hoisting of the stack mold carrier 10 so that the stack mold carrier 10 can be moved and navigated, for the purpose of installation, etc., relative to the platen assembly 12 and the injection molding machine without tipping. By configuring the lift support body 56 and lifting mechanism coupler 57 to ensure that lifting of the stack mold carrier 10 occurs vertically with a reduced incidence of tipping improves the overall safety with which the stack mold carrier 10 can be moved and installed relative to the injection molding machine.

In some embodiments, for example, the lift support body 56, includes an eyebolt 58 for receiving and releasably coupling with a corresponding hook 59 of a moveable crane arm (not shown) or other suitable equipment component for lifting and moving the stack mold carrier 10 relative to the platen assembly 12 of the injection molding machine. In some embodiments, for example, the lift support body 56 is connected to the second or upper end 42 of the mold support bar 38 such that the mold support bar 38, the base portion 30 and the linkage assembly 20 depend from the lift support body 56. In the subject example embodiment, the lift support body 56 is also cooperatively configured such that it cooperates with the propeller restraint system 46 for releasably retaining the propeller bar 22 in a fixed position, the lift support body 56 co-operating with the propeller restraints 48 or lock bolt for securing the propeller bar 22 in its upright, generally vertical, non-operational position.

In some embodiments, for example, the lift support body 56 is configured such that it can be brought into close proximity with the corresponding upper tie bar 19 of the platen 12 assembly as the stack mold carrier 10 is being positioned and installed relative to the injection molding machine. Accordingly, in some embodiments, the lift support body 56 is configured such that it defines a receiving portion 60 that is complementary in shape to the upper tie bar 19 such that the lift support body 56 can be disposed in close proximity to the upper tie bar when the stack mold carrier 10 is mounted relative to the platen assembly 12. The positioning of the lift support body 56 in closed proximity relative to the corresponding upper tie bar 19 of the platen assembly 12 is illustrated, for example, in FIGS. 8 and 9. Accordingly, in some embodiments, the receiving portion 60 of the lift support body 56 includes a concave radius. In some embodiments, the receiving portion 60 of the lift support body 56 includes a recess disposed within the lift support body 56 that is configured for receiving a corresponding portion of the upper tie bar 19 such that the lift support body 56 can be positioned in close proximity to the upper tie bar 19 to allow the stack mold carrier 10 to be positioned on the platen assembly 12 for proper operation of the mold. The lift support body 56 and the receiving portion 60 are configured such that a clearance gap 60' is disposed between the lift support body 56 and the corresponding upper tie bar 19 when the stack mold carrier 10 is positioned relative to the platen assembly 12. Accordingly, it will be understood that while the stack mold carrier 10 is intended to be positioned in close proximity to the platen assembly 12, the lift support body 56 does not come into contact with the upper tie bar 19, the receiving portion 60 and the upper tie bar 19 being cooperatively configured such that the clearance gap 60' remains present between the lift support body 56 and the upper tie bar 19. In some embodiments, for example, the clearance gap 60' is a minimum of about 0.0005 inches. In some embodiments, for example, the clearance gap 60' is about 0.010 inches. Accordingly, it will be understood that the clearance gap 60' disposed between the receiving portion 60 of the lift support body 56 and the upper tie bar 19 is such that installation of the stack mold carrier 10 on the platen assembly 12 is free from interference between the stack mold carrier 10 and the tie bars of the platen assembly 12 that would interfere with or impede displacement of the stack mold carrier 10 along the tie bars and/or machine guideway 14 during operation of the mold. The clearance gap 60' is also selected such that it is not so large so that the degree of displacement of the stack mold carrier 10 relative to the tie bars is such that would permit unwanted tipping of the stack mold carrier 10 relative to the tie bars of the platen assembly 12 to an extent or with such force that would increase the likelihood of damage to the platen assembly 12, for example, and/or increase the risk of injury to persons involved in the installation of the stack mold carrier 10 and operation of the mold or injection molding machine 14.

In some embodiments, for example, the receiving portion 60 of the lift support body 56 may include padding, for instance low friction padding, disposed at spaced apart intervals along the surface of the recessed area or receiving portion 60. In some embodiments, the padding may prevent damage to the tie bars should the stack mold carrier 10 be disposed out of its proper position relative to the platen assembly 12 and come into contact with the tie bars. However, it will be understood that even in embodiments wherein the lift support body 56 includes padding or padding portions disposed at spaced apart intervals along the contour of the receiving portion 60, that a clearance gap 60' between the tie bar and the lift support body (with padded regions) remains.

Figure 11:
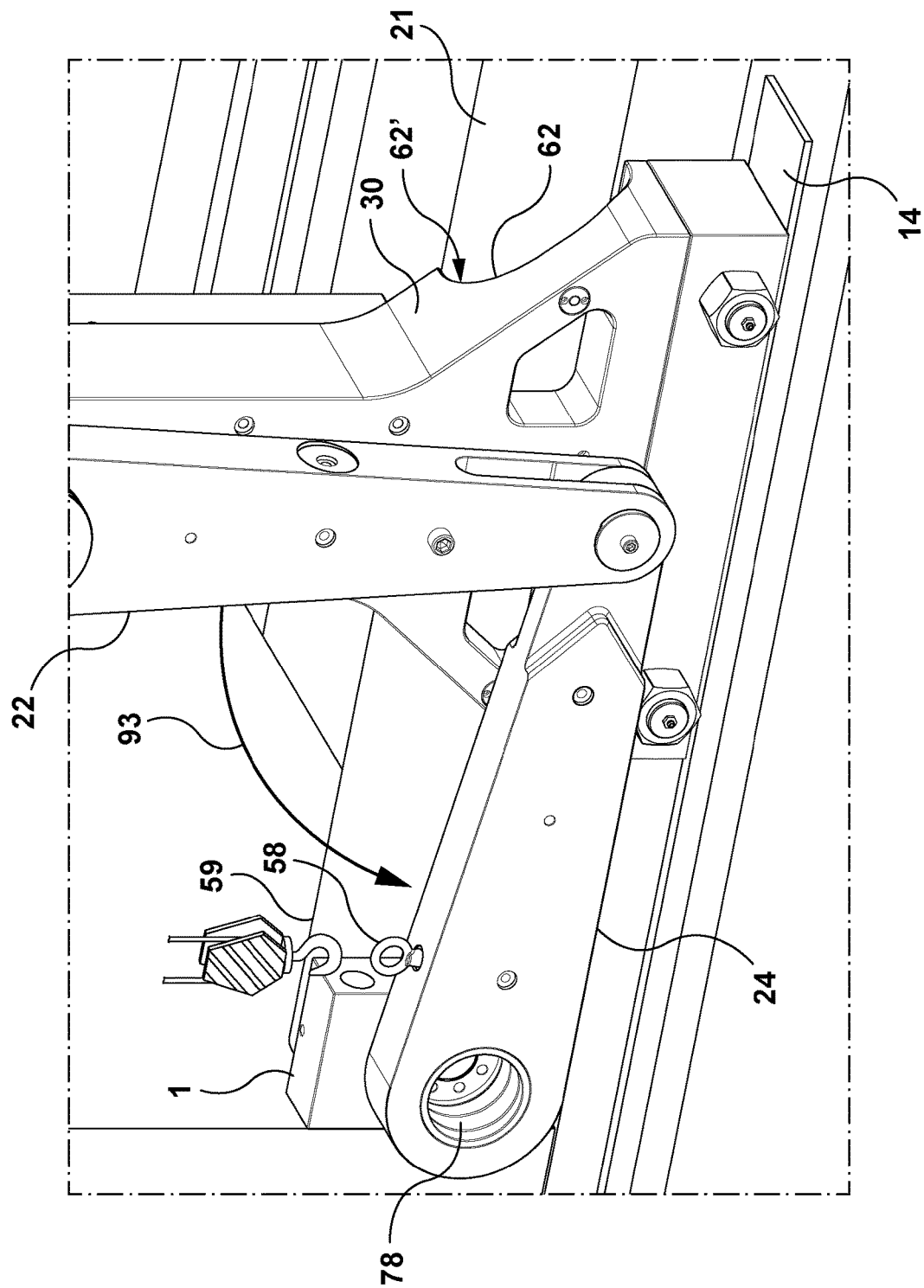
FIG. 11 is a detail view of the completion of the installation step as illustrated in FIG. 9 of a first link arm being positioned relative to a first platen of the platen assembly.
Figure 12:
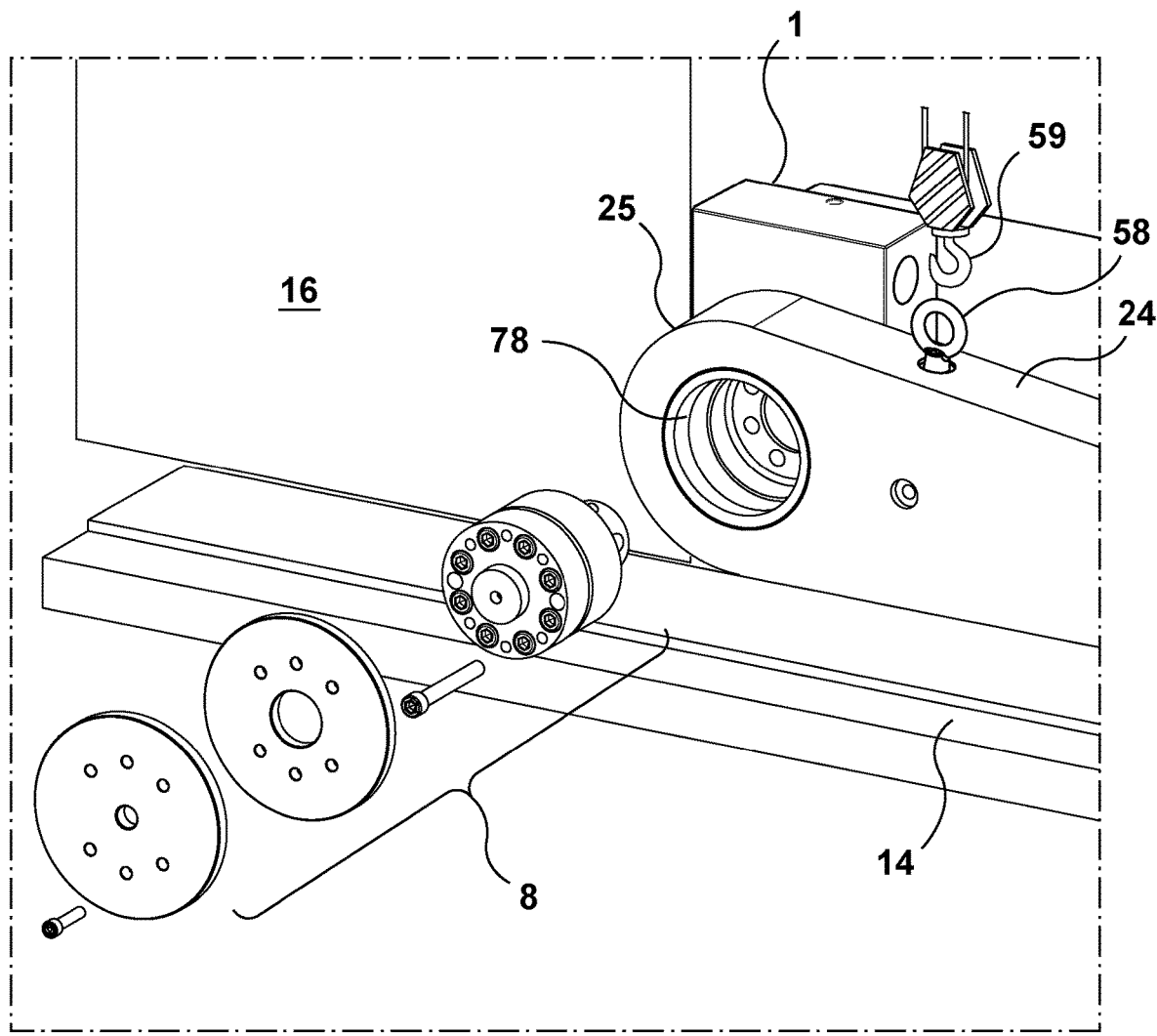
FIG. 12 is a detail, exploded assembly view of the completion of the installation step of FIG. 11 according to an example embodiment of the present disclosure.

As set out above, the base portion 30 supports the stack mold carrier 10 on the machine guideway 14 when the stack mold carrier 10 is installed on the platen assembly 12. In some embodiments, in order to ensure proper positioning of the stack mold carrier 10 adjacent the corresponding lower tie bar 21, the base portion 30 is configured such that it can be brought into close proximity with the corresponding lower tie bar 21 of the platen 12 assembly as the stack mold carrier 10 is positioned and installed relative to the injection molding machine, as shown for instance in FIGS. 11 and 14. Accordingly, in some embodiments, the base portion 30 includes a recessed area 62 that is complimentary in shape to at least a portion of the lower tie bar 21 such that the base portion 30 can be disposed in close proximity to the lower tie bar 21 when the stack mold carrier 10 is mounted relative to the platen assembly 12. Therefore, in some embodiments, for example, the recessed area 62 includes an area having a concave radius configured such that the base portion 30 can be disposed in close proximity to the corresponding lower tie bar 21 while maintaining a clearance gap 62' therebetween. The complimentary shaping of portions of the stack mold carrier 10, relative to the shape of the upper and lower tie bars 19, 21 of the platen assembly 12 helps to ensure that the stack mold carrier 10 can be positioned in close proximity to the platen assembly 12 to ensure proper positioning of the center mold section relative to the platen assembly 12 while still maintaining appropriate clearance gaps 60', 62', where appropriate, to help ensure proper operation of the stack mold carrier 10 and the mold. As described above in connection with the lift support body 56, in some embodiments, for example, the clearance gap 62' may be a minimum of about 0.0005 inches, while in other embodiments, for example, the clearance gap 62' may be about 0.010 inches. Accordingly, it will be understood that the clearance gap 62' is such that disposition of the stack mold carrier 10 relative to the platen assembly 12 does not bring the base portion 30 or carrier base 100 into proximity with the corresponding lower tie bar 21 so as to impede or interfere with the displacement of the stack mold carrier 10 along the tie bars and/or machine guideway 14. As well, the clearance gap 62' is not so large to as to allow unwanted displacement or tipping of the stack mold carrier 10 relative to the lower tie bar 21 that is likely to result in damage to the platen assembly and/or increase the risk of injury to a user should the stack mold carrier 10 become dislodged from the machine guideway 14 and/or tip relative to the platen assembly 12.

In some embodiments, for example, the stack mold carrier 10 includes a carrier restraint system or second restraint system 64 that is configured to assist with maintaining the proper positioning of the stack mold carrier 10 relative to the platen assembly 12 which may help to improve the overall safety of the stack mold carrier 10. For example, referring in particular to FIGS. 1, 6 and 7, in some embodiments, in order to help ensure proper positioning of the stack mold carrier 10 relative to the platen assembly 12 such that it remains positioned relative to the platen assembly 12 and avoids tipping over towards or away from the platen assembly 12, the carrier restraint system or second restraint system 64 is configured for retaining the stack mold carrier 10 relative to the corresponding upper tie bar 19 of the platen assembly 12. The carrier restraint system 64, therefore, is operable between an open condition wherein the stack mold carrier 10 is free to be positioned in close proximity to the corresponding upper tie bar 19 of the platen assembly 12 (or free to be moved away from the corresponding upper tie bar 19), and a closed or retaining condition wherein the stack mold carrier 10 is releasably retained in position relative to the upper tie bar 19 of the platen assembly 12 such that displacement of the stack mold carrier 10 away from the corresponding upper tie bar 19 is impeded. The releasable retaining of the stack mold carrier 10 relative to the upper tie bar 19 via the carrier restraint system 64 is such that displacement of the stack mold carrier 10 away from the platen assembly 12 in a direction generally transverse to the machine axis x-x is prevented or resisted, or substantially prevented or resisted. With the carrier restraint system 64 in place and disposed in the closed or retaining condition, while displacement of the stack mold carrier 10 away from platen assembly 12 in a direction generally transverse to the machine axis x-x is prevented, or substantially prevented, displacement of the stack mold carrier 10 along the tie bars 19, 21 and machine guideway 14 associated with the platen assembly 12, along the machine axis x-x, with displacement of the first, moveable platen 16, is permitted. The carrier restraint system 64, therefore, does not impede or interfere with displacement of the stack mold carrier 10 along the tie bars 19, 21 when disposed in the closed or retaining condition since the carrier restraint system 64 is configured such that it does not come into contact with the corresponding upper tie bar 19 unless the stack mold carrier 10 was to move out of its proper position on the machine guideway 14 putting the stack mold carrier 10 at risk of tipping or falling. It is only in such instances where the carrier restraint system 64 will actually engage the corresponding upper tie bar 19 as the contact between the components of the stack mold carrier 10 and carrier restraint system 64 will serve to prevent unwanted further displacement of the stack mold carrier 10 out of position relative to the platen assembly 12. Accordingly, with the carrier restraint system or second restraint system 64 in place and disposed in the closed or retaining condition, tipping of the stack mold carrier 10 towards or away from the upper tie bar 19 is prevented, or substantially prevented, which helps to improve the overall safety of the injection molding machine.

Figure 7:
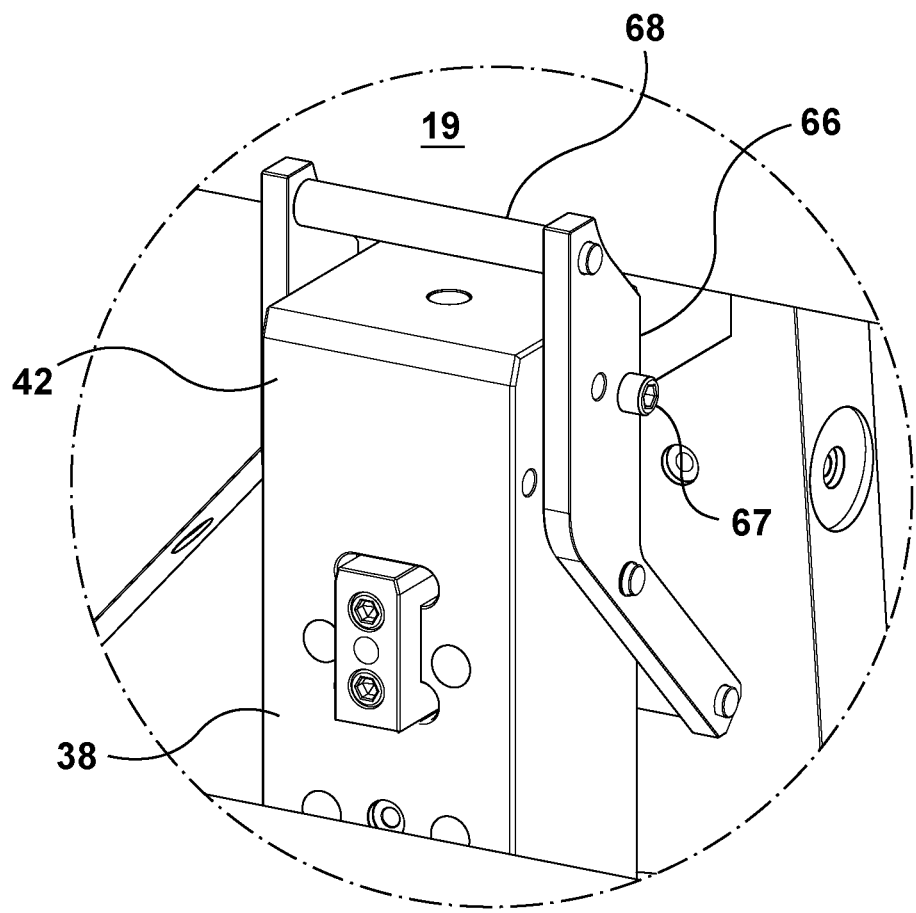
FIG. 7 is a detail view of the encircled area 7 of FIG. 6.

In some embodiments, for example, the carrier restraint system 64 includes a lock bar 66 that is pivotally mounted proximal the upper free end 42 of the mold support bar 38. The lock bar 66 is mounted proximal the upper free end 42 of the mold support bar 38 such that it pivots between an open, unlocked position, as shown in FIG. 1, wherein the lock bar 66 is disposed downwardly away from the upper tie bar 19 (illustrated schematically by directional arrow 65), and a closed or locked position, as shown in FIG. 7, wherein the lock bar 66 is disposed such that a tie-bar engaging portion 68 of the lock bar 66 is disposed such that at least a portion of the upper tie bar 19 is disposed between or intermediate the receiving portion 60 of the lift bar support 56 and the lock bar 66 while maintaining clearance around the upper tie bar 19. Accordingly, it will be understood that once the lock bar 66 is secured in the closed, or locked position, the lock bar 66 and the tie-bar engaging portion 68 do not come into contact with the upper tie bar 19 during normal operation of the stack mold carrier 10 or during installation or positioning of the stack mold carrier 10 relative to the upper tie bar, the lock bar 66 and the tie-bar engaging portion 68 only coming into contact with or engaging with the upper tie bar 19 should the stack mold carrier 10 tip away from or otherwise begin to move away from the platen assembly 12. Accordingly, once the lock bar 66 of the carrier restraint system 64 is disposed in the closed or locked condition such that the upper tie bar 19 is disposed between the recess 60 of the lift support body 56 and the tie-bar engaging portion 68 of the lock bar 66 of the carrier restraint system 64, displacement of the stack mold carrier 10 away from the upper tie bar 19, along an axis generally transverse to the machine axis x-x, for example axis y-y, is prevented. In some embodiments, for example, the lock bar 66 may also serve to guide the stack mold carrier 10 along the upper tie bar 19 as the stack mold carrier 10 with center mold section (not shown) is displaced along the tie bars and machine guideway 14 during molding operations. With the lock bar 66 in position and disposed in the closed or locked position, tipping or toppling of the stack mold carrier 10 away from the platen assembly 12 is prevented, or substantially prevented as the lock bar 66 would engage or contact the upper tie bar 19 preventing the stack mold carrier 10 from tipping or falling over. As well, in the event of installation errors and if the center mold section was to topple over towards the tie bars 19, 21, once again the lock bar 66 would hit the upper tie bar 19 which would prevent the center mold section from falling over. Therefore, the carrier restraint system 64 or lock bar 66 provides a fail-safe feature that prevents the possible toppling over of the center mold section, the carrier restraint system 64 or lock bar 66, therefore, serving to improve the overall safety of the stack mold carrier 10 and the injection molding machine. In order to secure the lock bar 66 in its closed or locked position, locking screws 67, or any other suitable means, are used to fix the lock bar 66 in its closed or locked position, the locking screws 67 co-operating with corresponding threaded openings or bores disposed in the mold support bar 38.

Figure 1A:
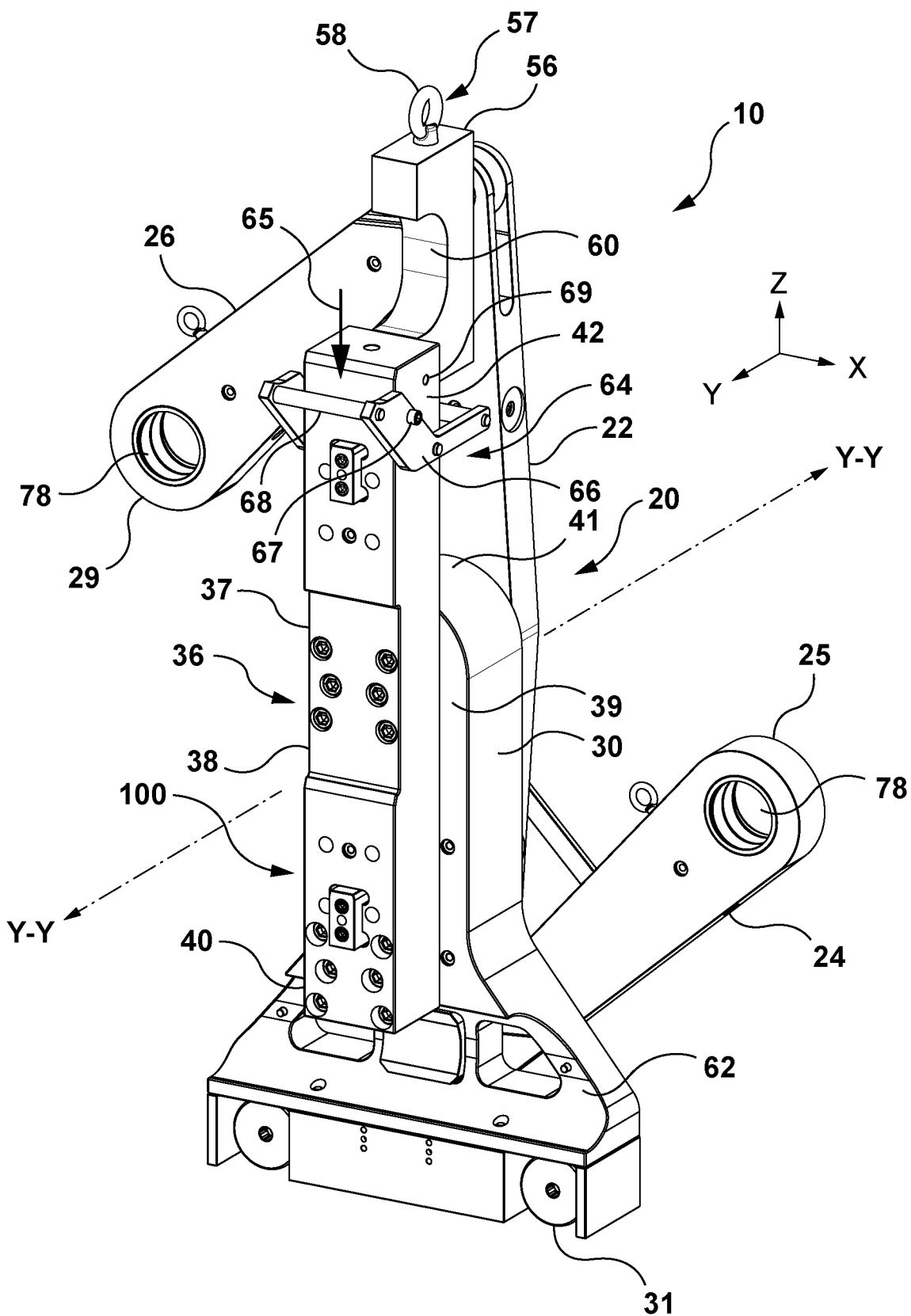
FIG. 1A is a perspective view of a stack mold carrier according to another example embodiment of the present disclosure.

In some embodiments, for example, in order to further secure and/or position the stack mold carrier 10 relative to the platen assembly 12, the carrier restraint system 64 may further include a lower tie bar guide block 70 that is configured to assist with the securing and/or positioning of the stack mold carrier 10 relative to the corresponding the lower tie bar 19 such that displacement of the stack mold carrier 10 away from the lower tie bar 21, along an axis generally transverse to the machine axis x-x, is prevented or further resisted. In some embodiments, the lower tie bar guide block 70 also serves to assist with guiding displacement of the stack mold carrier 10 along the lower tie bar 21 by preventing unwanted travel of the stack mold carrier 10 away from the tie bars 21 and/or off the machine guideway 14. In some embodiments, for example, the lower tie bar guide block 70 is configured for removable or releasable mounting to the base portion 30 of the stack mold carrier 10, the lower tie bar guide block 70 including a curved portion that is generally complimentary in shape to the profile of at least a portion of the lower tie bar 21. Accordingly, in some embodiments, for example, the lower tie bar guide block 70 includes a curved portion or recessed area 72 that is generally complimentary in shape to, the outer periphery of the lower tie bar 21, as shown for instance in FIGS. 1 and 6. In some embodiments, for example, the lower tie bar guide block 70 is removably or releasably mounted to the base portion 30 via bolts or threaded members that extend through the lower tie bar guide block 70 and are received within corresponding threaded openings disposed in the base portion 30. However, it will be understood that the lower tie bar guide block 70 may be secured to the carrier base 100 or base portion 30 of the stack mold carrier 10 by any suitable means. While the lower tie bar guide block 70 is shown in the example embodiment of the stack mold carrier 10 of FIG. 1A, it will be understood that, in other embodiments, the stack mold carrier 10 is not used in conjunction with a lower tie bar guide block 70 and that the carrier restraint system 64 may only include the lock bar 66.

Installation of the stack mold carrier 10 on the platen assembly 12 of an injection molding machine will now be described in further detail having regard, in particular to FIGS. 1 and 4-14.

As set out above, the stack mold carrier 10 is an assembled unit that includes a carrier base 100 (or base portion 30), a linkage assembly 20, and a mold support portion 36. The first restraint system or propeller restraint system 46 ensures that the stack mold carrier 10 is disposed in a first condition wherein the linkage assembly 20 of the stack mold carrier 10 is disposed in a fixed, non-operational position where displacement of the linkage assembly components relative to the carrier base 100, or base portion 30, of the stack mold carrier 10 is prevented. Prior to lifting the assembled stack mold carrier 10, the second restraint system or carrier restraint system 64 is disposed in its first, or open condition wherein the lock bar 66 is disposed in its open position wherein the lock bar 66 is disposed downwardly and away from the lift support body 56 as shown, for instance, in FIG. 1 (or FIG. 1A), with schematic directional arrow 65. In embodiments wherein the carrier restraint system 64 further includes a lower tie bar guide block 70, as shown for instance in the example embodiment of FIG. 1, prior to lifting of the assembled stack mold carrier 10, the lower tie bar guide block 70 is temporarily placed aside or stored for later use to secure the stack mold carrier 10 in position on the platen assembly. From this position, the hook 59 of a crane arm, or any other suitable lifting means, is engages the lift support bar 56, by way of eye bolt 58, for lifting the stack mold carrier 10 and positioning the stack mold carrier 10 relative to the platen assembly 12 of the injection molding machine, as illustrated, for instance in FIG. 4. As shown, the stack mold carrier 10 is lowered (see directional arrow 90 in FIG. 4) and positioned relative to the platen assembly 12 such that the base portion 30 sits on the machine guideway 14 on one side of the platen assembly 12 in close proximity to the corresponding upper and lower tie bars 19, 21, with the linkage assembly 20 disposed on the outside of the stack mold carrier 10. The stack mold carrier 10 is then moved inwards, relative to the platen assembly 12, such that the stack mold carrier 10 is positioned adjacent the corresponding tie bars 19, 21, as illustrated by directional arrow 91 in FIG. 5 with the upper and lower tie bars 19, 21 being positioned within the corresponding recessed portion or recessed area of the lift support body 56 and base portion 30 of the carrier base 100 of the stack mold carrier 10. In the subject example embodiment, the base portion 30 includes rollers for displacing the stack mold carrier along the machine guideway 14, although, as set out above, the subject stack mold carrier 10 is not necessarily limited to linear guideways with rollers.

In some embodiments, the stack mold carrier 10 includes additional locating features 75 which confirm that the stack mold carrier 10 is appropriately positioned relative to the platen assembly 12. In some embodiments, for example, the locating features 75 include a pin indicator 76 which lies flush with an indicator surface 77 once the stack mold carrier 10 is positioned in close proximity to the corresponding tie bars 19, 21, as illustrated for example in FIG. 5A.

Figure 6:
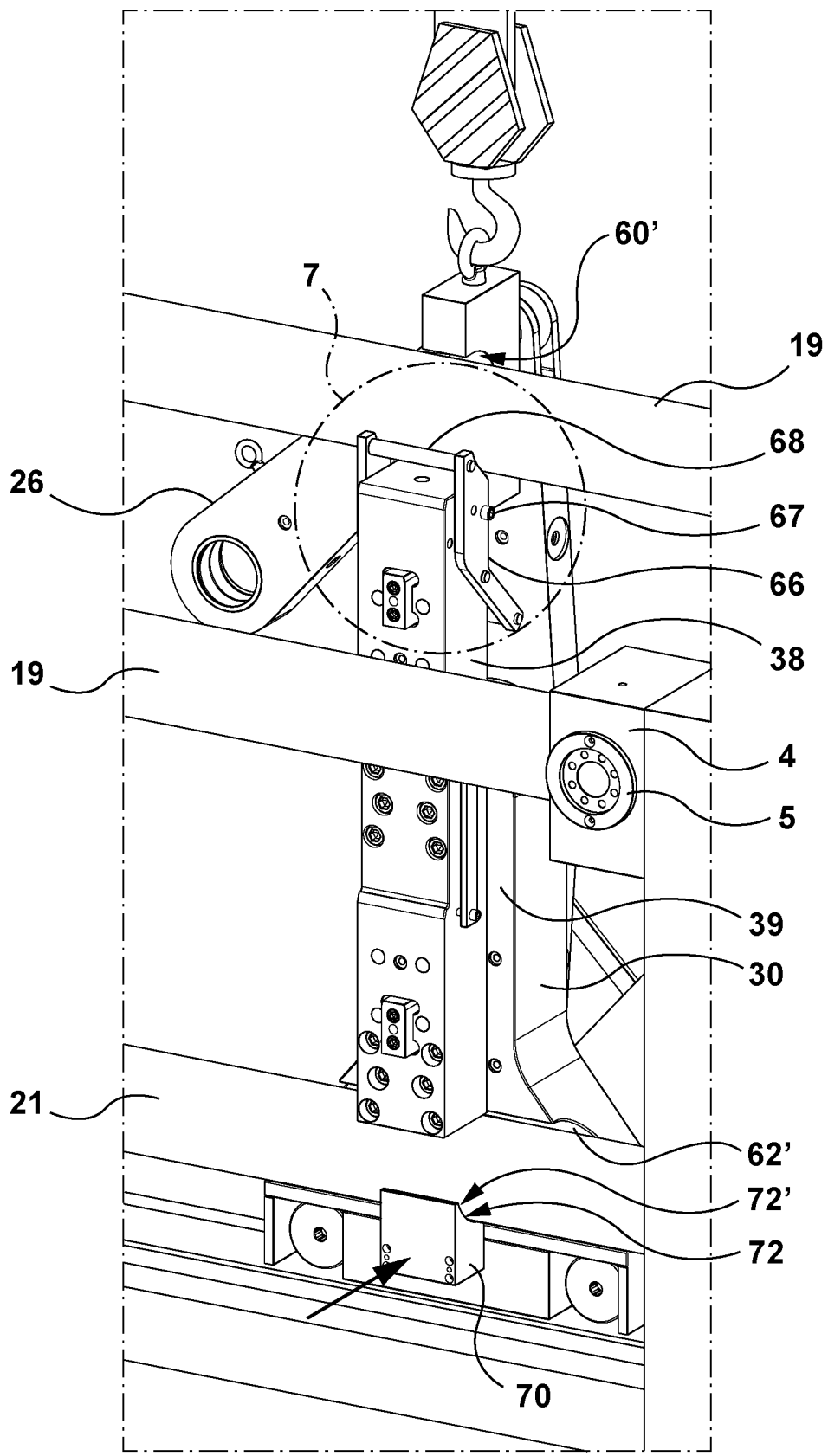
FIG. 6 is a detail rear, perspective view of the stack mold carrier and platen assembly of FIG. 5 with a carrier restraint system in place.

Once the stack mold carrier 10 is positioned in close proximity relative to the corresponding tie bars 19, 21, the user activates the carrier restraint system 64, by releasing lock screws 67 from their first position (illustrated in FIG. 1), such that the carrier restraint system 64 becomes disposed in its closed, or latched, or retaining position in order to secure the stack mold carrier 10 in positon relative to the platen assembly 12. More specifically, the carrier restraint system 64 is activated such that the lock bar 66 associated with the upper tie bar 19 is flipped or pivoted upwards relative to the mold support bar 36 such that the upper tie bar engaging rod 68 is disposed proximal the inner side of the upper tie bar 19, as illustrated, for example in FIG. 6, and the lock screws 67, that are originally used to hold the lock bar 66 in its open position are then disposed in their second position (illustrated in FIG. 6) are used to secure the lock bar 66 in its closed position, as illustrated, for example, in FIG. 7. In embodiments that include a lower guide block 70, the lower tie bar guide block 70, which was temporarily placed aside, is once again secured in position on the base portion 30 such that the lower guide block 70 is disposed in closed proximity to the corresponding lower tie bar 21, as illustrated in FIG. 6, with at least a portion of the lower tie bar 21 being disposed between the base portion 30 and the lower tie bar guide block 70 while maintaining a clearance gap 72' therearound. In some embodiments, for example, the clearance gap 72' between the lower tie bar 21 and the lower tie bar guide block 70 is similar to the clearance gap 62' disposed between the base portion 30 and between the lower tie bar 21 and, in some embodiments may be a minimum of 0.005 inches while in other embodiments may be about 0.010 inches. Accordingly, the clearance gap 72' is such that lower tie bar guide block 70, when used, does not impede or interfere with displacement of the stack mold carrier along the tie bars or machine guideway 14.

Figure 8:
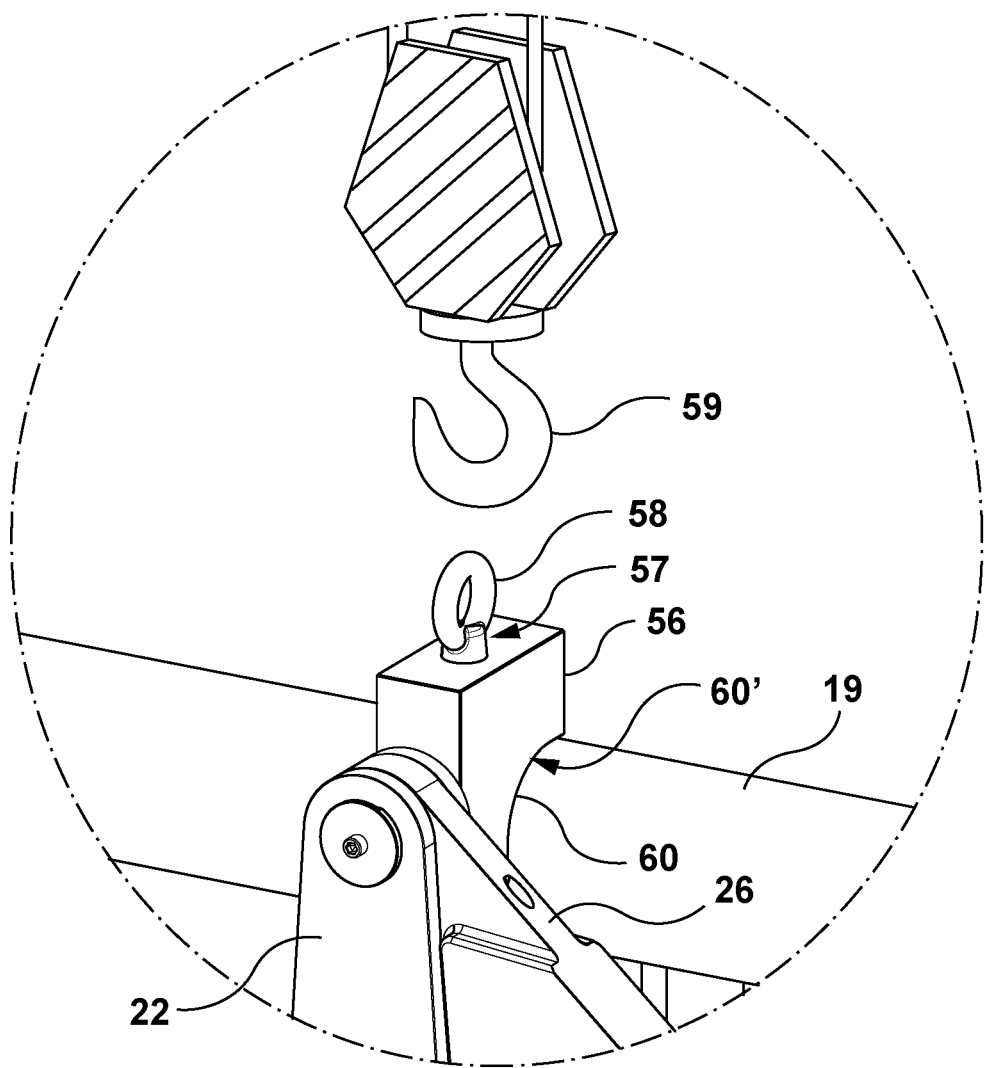
FIG. 8 is a detail view of the lift support bar of the stack mold carrier as disposed relative to the platen assembly.
Figure 9:
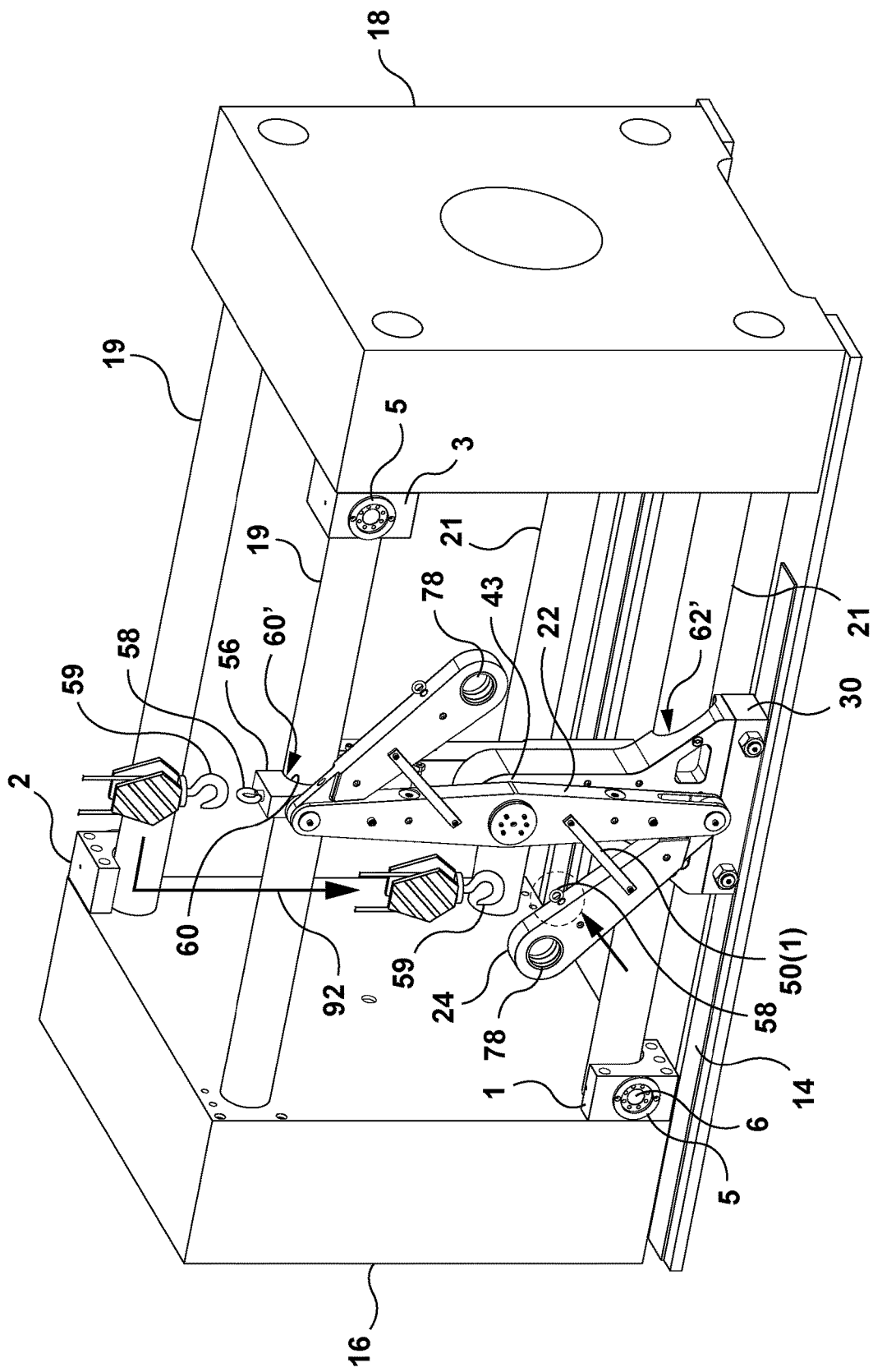
FIG. 9 is a front, perspective view of a further installation step of the stack mold carrier being installed on the platen assembly.
Figure 10:
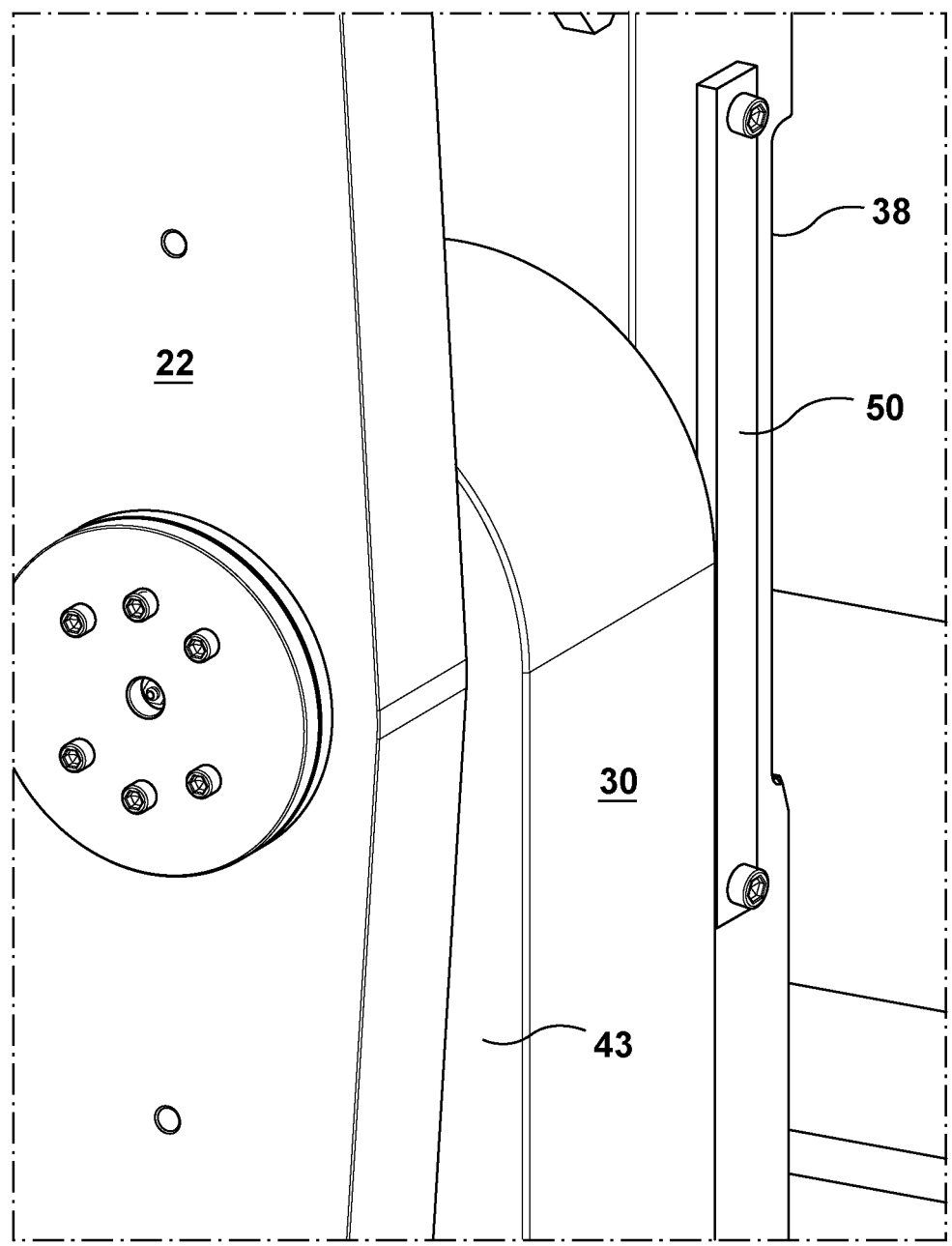
FIG. 10 is a detail view of a portion of the stack mold carrier after removal of a portion of the propeller restraint system of the stack mold carrier.

Once the carrier restraint system 64 is disposed in its closed, or latched or retaining position, such that displacement of the stack mold carrier 10 away from the platen assembly 12 along an axis generally transverse to the machine axis x-x, for instance axis y-y, is prevented, the hook 59 from the associated crane arm, or other suitable lifting means, is released from engagement with the lift support bar 56, as illustrated in FIG. 8, and becomes re-connected to the stack mold carrier 10, with the hook 59 engaging the first link arm 24, as illustrated schematically in FIG. 9 with directional arrow 92. In some embodiments, the first link arm 24 includes an eye bolt 58 for facilitating engagement with the hook 59 of the crane arm (not shown). Only once the first link arm 24 is engaged by the hook 59 of the corresponding crane arm or lifting means, the first latch bar 50(1) of the first or propeller restraint system 46 is removed and stored for later use. In some embodiments, the stack mold carrier 10 includes a storage area in which the latch bars 50 of the propeller restraint system 46 can be secured. An example embodiment of a latch bar secured to the stack mold carrier 10 in the storage area is illustrated in FIG. 10.

Once the crane arm engages the first link arm 24 and the corresponding latch bar 50 is removed, the first link arm 24 is no longer fixed relative to the propeller bar 22. The first link arm 24, therefore, can be pivoted downwards, as illustrated by schematic directional arrow 93 in FIG. 11, and brought into position for securing the second end 25 of the first link arm 24 to the first platen 16 or to the corresponding mounting block 1 associated with the first platen 16. In the subject example embodiment, corresponding pairs of mounting brackets 1, 3 and 2, 4 are provided and pre-installed on the platens 16, 18 for cooperating with the link arms 24, 26 to secure the linkage assembly 20 to the platen assembly 12. In order to ensure the first link arm 24 aligns with the corresponding mounting bracket 1 on the first platen 16, the stack mold carrier 10 may also need to be manually jogged or urged along the machine guideway 14 during installation.

In embodiments that incorporate mounting blocks for securing the link arms to the platens of the platen assembly 12, the mounting brackets 1, 2, 3, 4, each include a hub portion 5 with a bore opening 6 for cooperating with the corresponding end of the first or second link arm 24, 26 and the corresponding mounting hub components 8 such that the link arms 24, 26 are pivotally connected to the respective first or second platen 16, 18 directly, or via the corresponding mounting bracket. Accordingly, in some embodiments, for example, the first and second link arms 24, 26 include openings 78 which align with the bore opening 6 in the hub portion of the corresponding mounting bracket 1, 2, 3, 4 for receiving and coupling with the mounting hub components 8 as illustrated, for example, in the exploded assembly view of FIG. 12.

Figure 13:
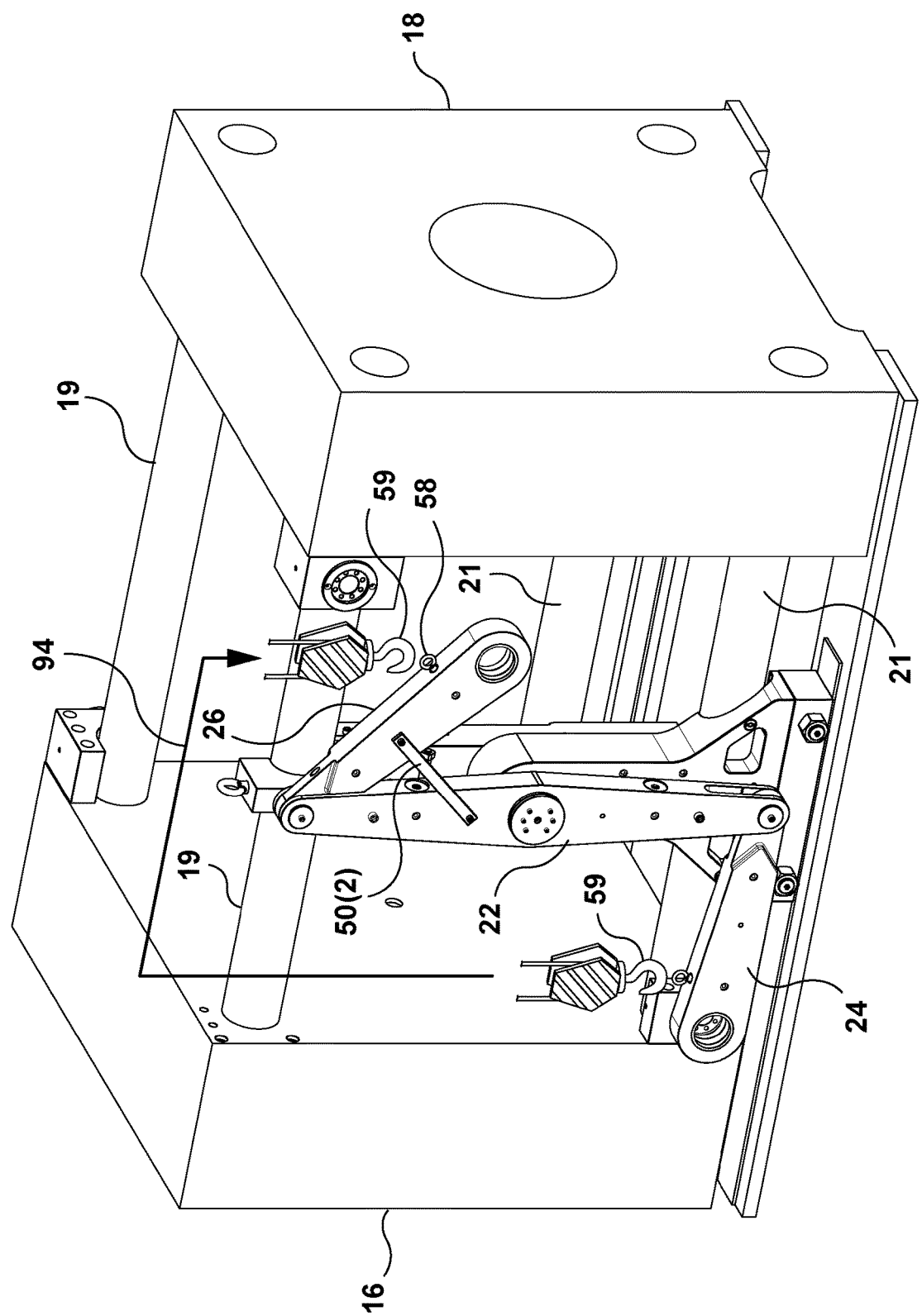
FIG. 13 is a front, perspective view of a further installation step of the stack mold carrier being installed relative to the platen assembly of a second link arm being positioned relative to a second platen of the platen assembly.

Once the first link arm 24 is pivotally connected to the corresponding mounting bracket 1 on the first platen 16, the hook 59 associated with the crane arm, or other suitable lifting means, is released from engagement with the first link arm 24 for releasable coupling with the second link arm 26 as shown in FIG. 13 with reference to schematic directional arrow 94. Accordingly, in some embodiments, for example, the second link arm 26 is also equipped with an eye bolt 58 for releasably engaging with the hook 59 of the associated crane arm or lifting means. Once the second link arm 26 is engaged and supported by the crane arm or lifting means, the second latch bar 50(2) is removed and stored, in a similar manner as the first latch bar 50(1), and the second link arm 26 is pivoted relative to the propeller bar 22 until it becomes aligned with the hub portion 5 and bore opening 6 of the corresponding mounting bracket 3 disposed on the second platen 18, the second link arm 26 being pivotally connected to the mounting bracket 3 in the same manner as the first link arm 24. In order to ensure that the second link arm aligns with the corresponding mounting bracket 3 on the second platen 18, the second platen 18 may need to be manually jogged or displaced along the tie bars 19, 21 and machine guideway 14. Once both the first and second link arms 24, 26 are pivotally connected to the corresponding mounting bracket 1, 3 on the corresponding first or second platen 16, 18, the propeller restraints 48 are removed thereby releasing the propeller bar 22 from its fixed position relative to the base portion 30, the propeller bar 22 therefore being able to pivot or rotate relative to the base portion 30 of the stack mold carrier 10. The same set-up or installation procedure is used to install a second stack mold carrier 10 on the opposite side of the platen assembly 12.

Figure 15:
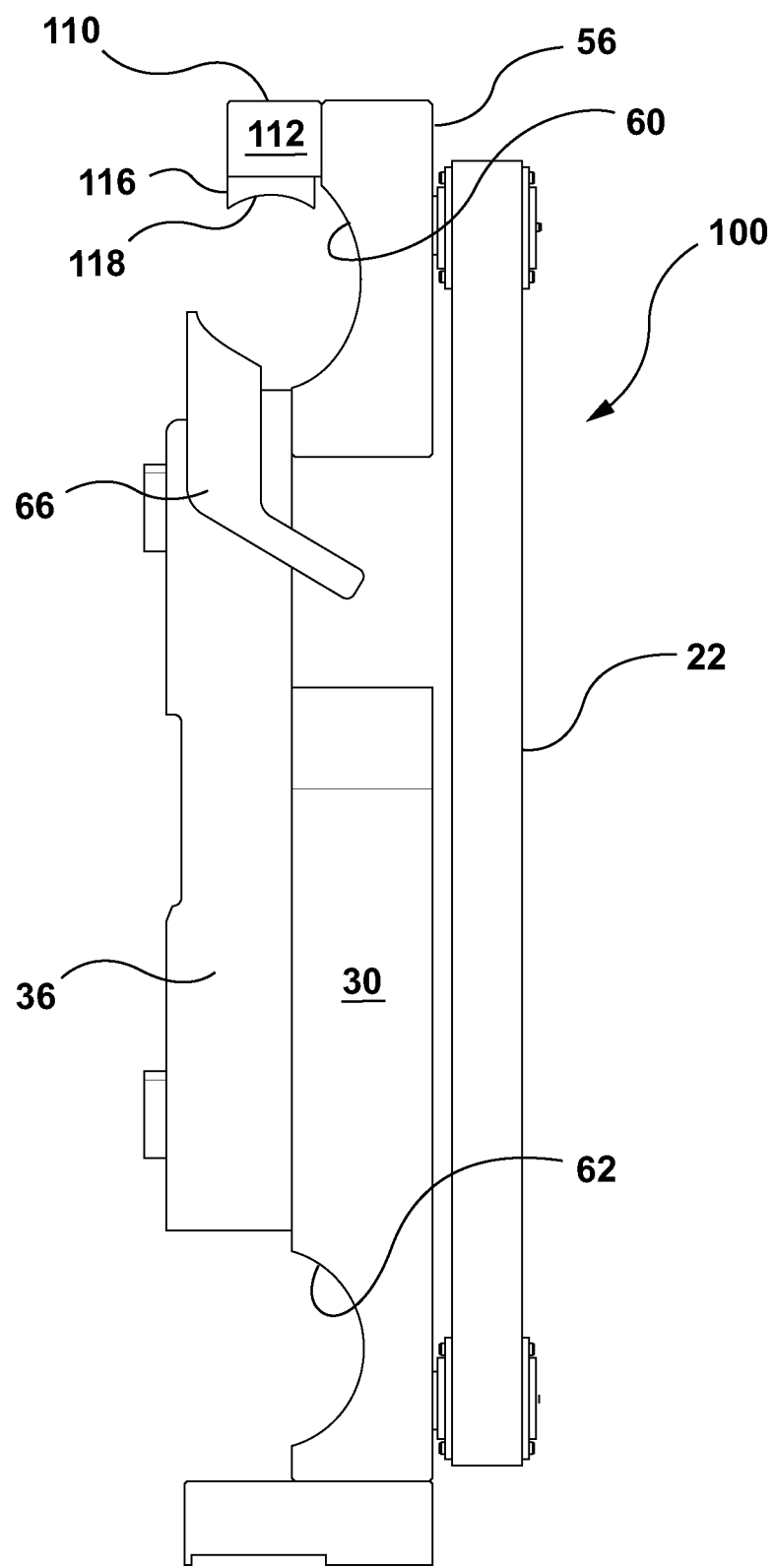
FIG. 15 is a side view of an alternate embodiment of the stack mold carrier 10 according another example embodiment of the present disclosure.
Figure 16:
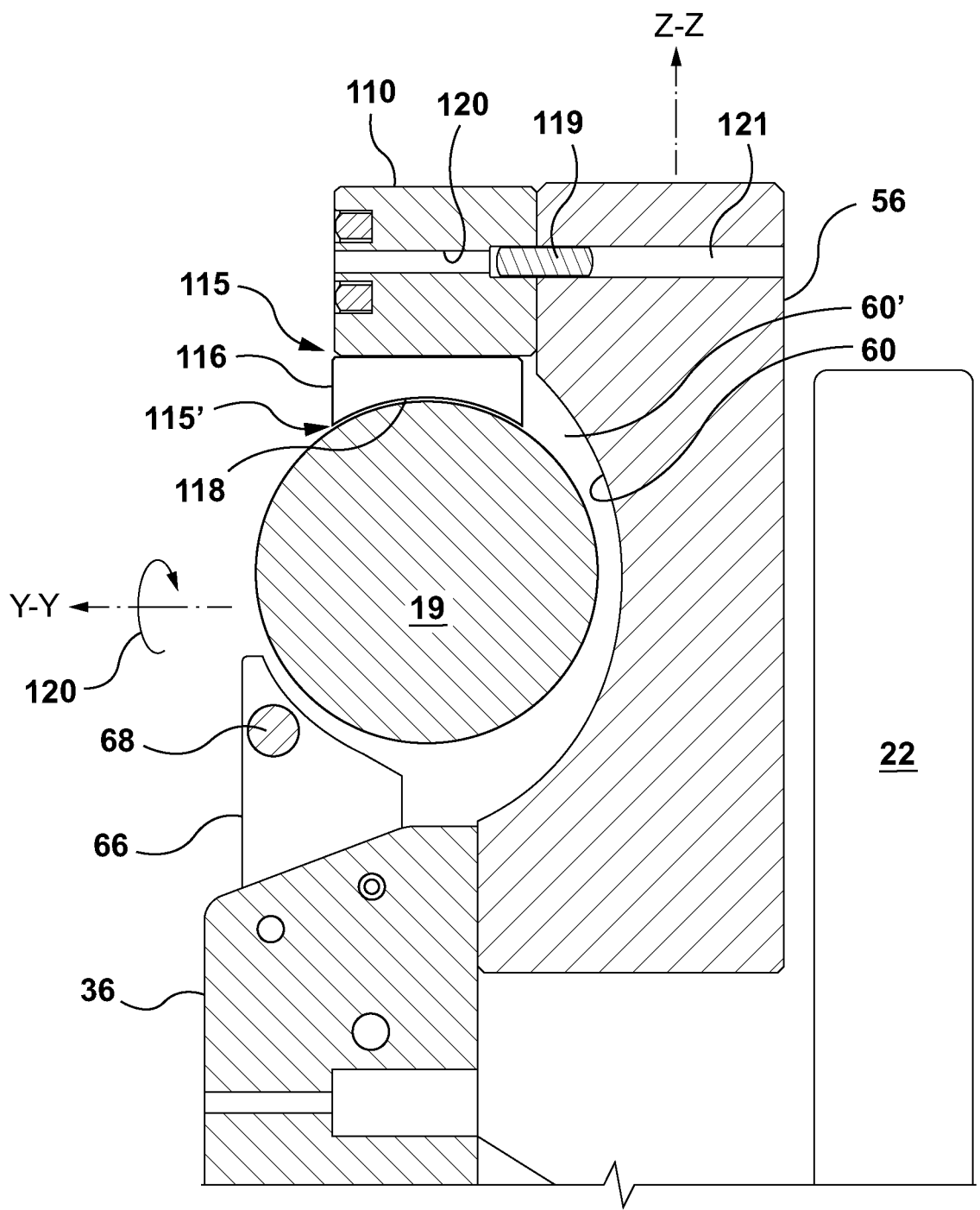
FIG. 16 is a cross-sectional side, detail view of the stack mold carrier of FIG. 15 mounted relative to the upper tie bar of the platen assembly.
Figure 17:
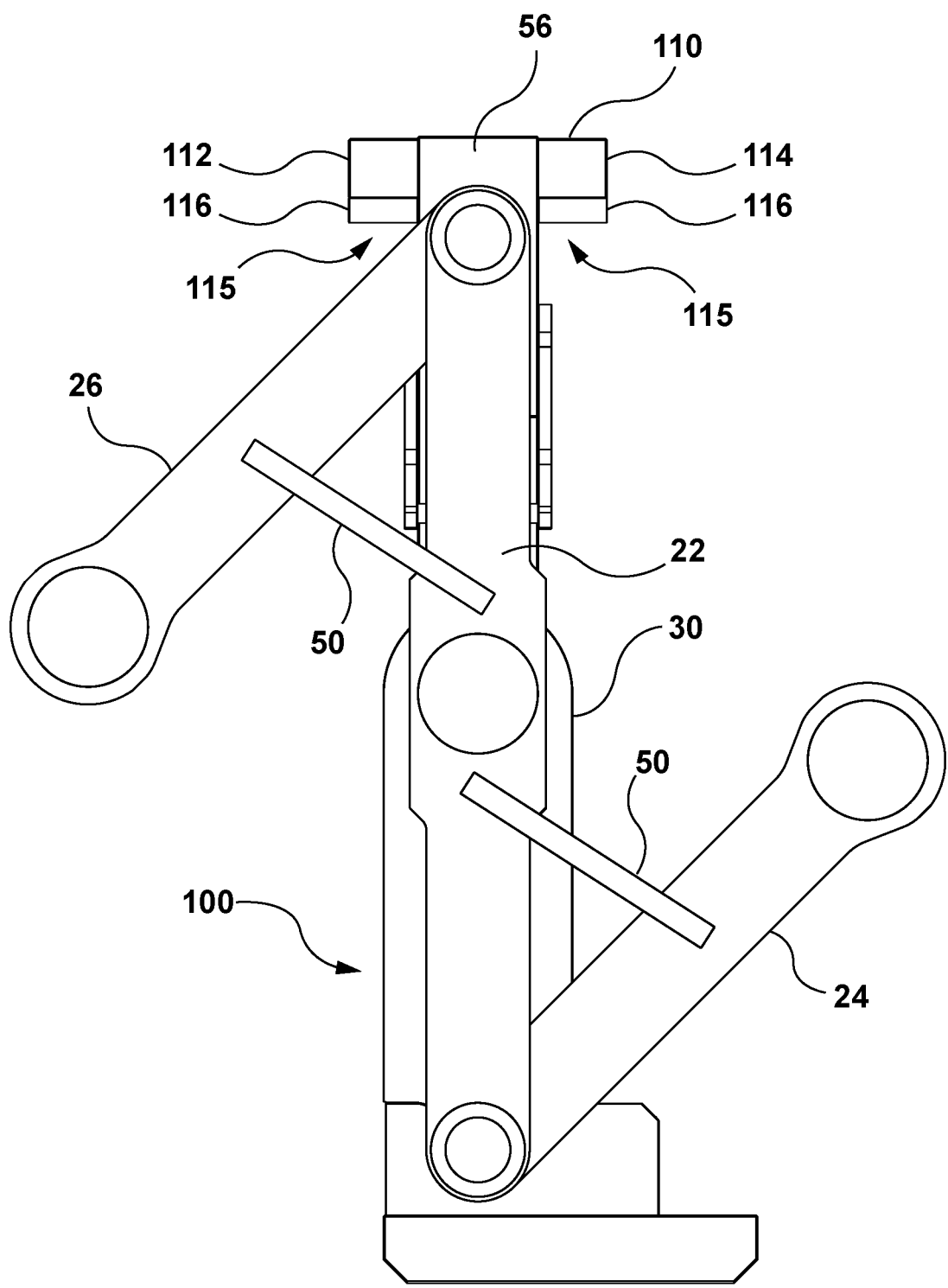
FIG. 17 is a front view of the stack mold carrier according to the example embodiment of FIG. 15 as viewed from the linkage assembly side.
Figure 18:
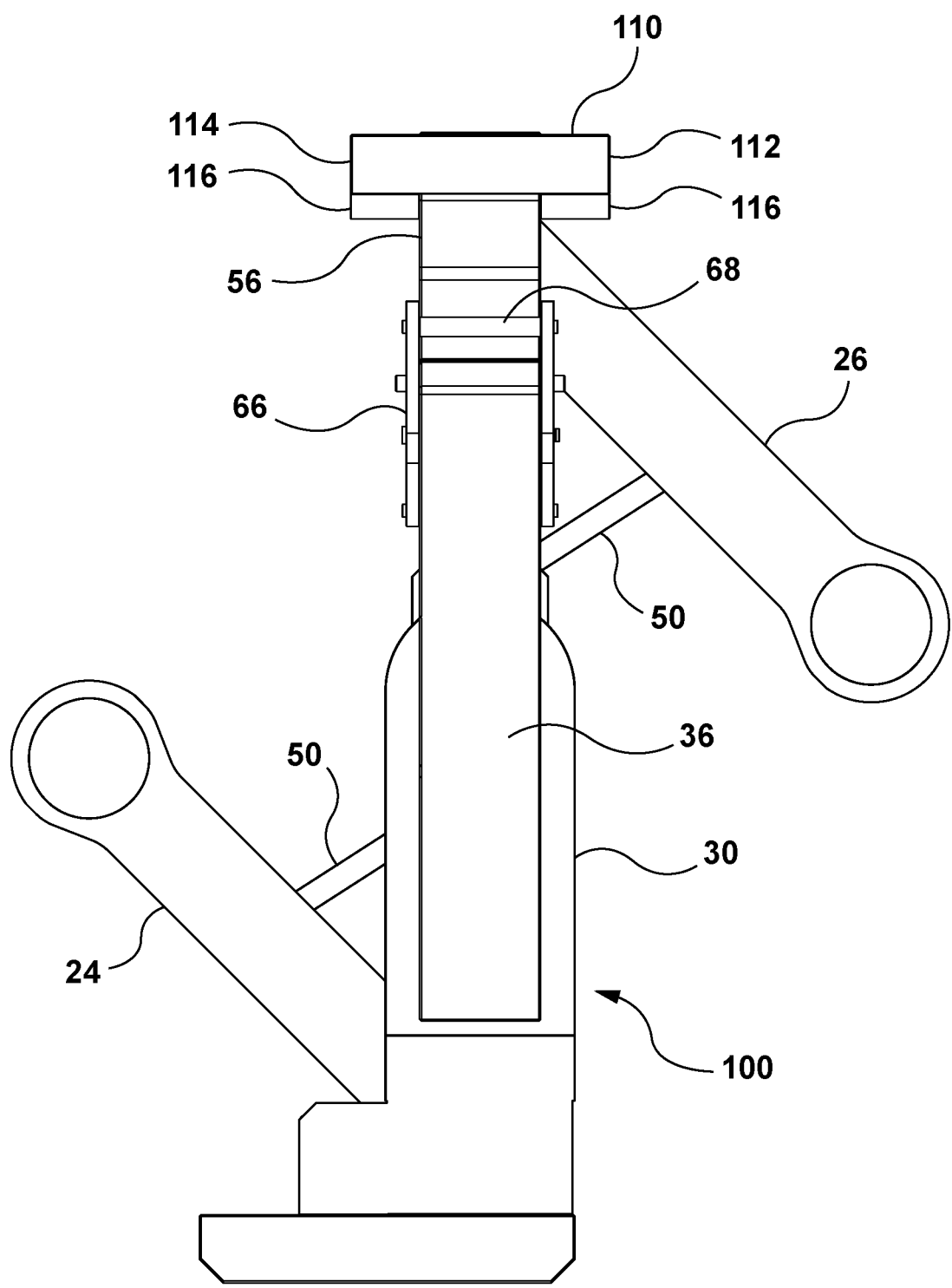
FIG. 18 is a rear view of the stack mold carrier according to the example embodiment of FIG. 15 as viewed from the mold side or platen assembly side.

Referring now to FIGS. 15-17 there is shown another example embodiment of a stack mold carrier 10 according to the present disclosure, wherein like reference numerals have been used to identify similar components.

In the subject example embodiment, stack mold carrier 10 is similar to the embodiment described in connection with FIGS. 1-14, however, the subject example embodiment includes a tilt-impeding member 110 that further assists with securing and/or positioning of the stack mold carrier 10 relative to the upper tie bar 19 of the platen assembly 12. Accordingly, the tilt impeding member 110 assists with ensuring that the stack mold carrier 10 is properly positioned relative to the platen assembly 12 of the injection molding machine.

The tilt-impeding member 110 is rigidly attached, fixed or otherwise rigidly connected to the lift support body 56 such that it extends generally perpendicular to the lift support body 56. The tilt-impeding member 110, therefore, extends longitudinally, generally parallel to the longitudinal axis of the upper tie bar 19 or generally parallel to the machine axis x-x, between first and second ends 112, 114. In some embodiments, for example, the tilt-impeding member 110 includes a cross bar. In some embodiments, for example, the tilt-impeding member 110 is secured or rigidly connected to the lift support body 56 via a threaded member 119 that extends through and engages with corresponding openings 120, 121 disposed within the tilt-impeding member 110 and lift support body 56, as illustrated, for example, in FIG. 16. However, it will be understood that the tilt-impeding member 110 can be secured to the lift support body 56 using any suitable method known in the art to ensure a rigid connection between the two components.

At each of its first and second ends 112, 114, the tilt-impeding member 110 includes an upper-tie-bar engaging portion 115 that is configured for disposition in close proximity to at least a portion of the upper tie bar 19 of the platen assembly 12. Accordingly, the tilt impeding member 110 is disposed such that the upper tie bar engaging portion 115 is disposed in close proximity to the corresponding upper tie bar 19 with a corresponding clearance gap 115' disposed therebetween. Therefore, the upper tie bar engaging portion 115 does not come into contact with and does not engage with the corresponding upper tie bar 19 unless the stack mold carrier 10 is displaced out of its proper operational position relative to the platen assembly 12, for instance in the case of tipping or tilting of the stack mold carrier 10.

In some embodiments, for example, each upper tie-bar engaging portion 115 includes a friction-reducing member 116 disposed, independently, at each of the first and second ends 112, 114 of the tilt-impeding member 110. The friction-reducing member 116 is disposed such that it depends from an underside of the tilt-impeding member 110 and includes a recessed area 118 having a concave radius that, generally, is complimentary to at least a portion of the outer radius of the upper tie bar 19 of the platen assembly 12. The concave radius of the recessed area 118 is such that as the stack mold carrier 10 is positioned in close proximity to the platen assembly 12 during installation of the stack mold carrier 10 on the injection mold, the tilt-impeding member 110 is disposed relative to the upper tie bar 19 of the platen assembly 12 such that the friction-reducing members 116 are disposed in direct opposition to and slightly spaced apart from the outer surface of the upper tie bar 19. In some embodiments, for example, the friction-reducing members 116 include brass and/or Nylon bearing pads and/or low friction alloy composites that are rigidly attached, or otherwise fixed, to the tilt-impeding member 110.

When the stack mold carrier 10 is disposed or mounted relative to the platen assembly 12 of the injection molding machine, the tilt-impeding member 110, the friction-reducing members 116 and the upper tie bar 19 are cooperatively configured such that: (i) displacement of the stack mold carrier 10 along the upper tie bar 19, as the carrier base 100 or base portion 30 is guided along the machine guideway 14 during mold opening and closing operations, is permitted; and (ii) rotation or tilting of the stack mold carrier 10 relative to the upper tie bar 19 is prevented, or substantially prevented. More specifically, disposition of the tilt-impeding member 100 relative to the corresponding upper tie bar 19 serves to prevent, or substantially prevent, any displacement of the stack mold carrier 10 about an axis y-y that extends generally perpendicular to a vertical axis z-z of the stack mold carrier 10 and/or that extends generally transverse to the machine axis x-x. Therefore, if considering the machine axis x-x or the longitudinal axis of the upper tie bar as the X-axis of a Cartesian coordinate system, the vertical axis z-z of the stack mold carrier as the Z-axis of the Cartesian coordinate system and the axis y-y that extends generally transverse to the vertical axis z-z of the stack mold carrier 10, as the Y-axis of the Cartesian coordinate system, with the X-Y-Z Cartesian coordinate system illustrated for reference in FIGS. 2 and 17. Accordingly, the tilt-impeding member 110 prevents displacement or rotation of the stack mold carrier 110 about the axis y-y (or the Y-axis) relative to the platen assembly 12 such that one of the first and second ends 112, 114 of the tilt-impeding member 110 becomes disposed farther away from the upper tie bar 19 than the other one of the first and second end 112, 114. Accordingly the tilt-impeding member 110 provides an additional safety mechanism wherein tilting or toppling over of the stack mold carrier relative to the platen assembly 12 of the injection mold, which could result in injury to a mold setter or any other individuals involved in the positioning of and placement of the stack mold carrier 10, is prevented even once the lift support bar 56 is disengaged from the lifting device, e.g. mobile crane arm, forklift, etc. The tilt-impeding member 110 also serves to prevent and minimize the risk of toppling over even when the stack mold carrier is not physically attached to or secured to the platen assembly 12 or the injection mold by any other conventional means. For example, prior to the carrier restraint system 64 being disposed in the closed position, the tilt-impeding member 110 may serve to reduce and/or prevent toppling over of the tack mold carrier is the tilt-impeding member 110 will interfere with displacement of the stack mold carrier 10 out of contact with the guiding mechanism 14 in the absence of securing of the stack mold carrier 10 to the platen assembly 12. In some embodiments, for example, the tilt-impeding member 110 works in conjunction with the lock bar 66, which pivots between the open, unlocked position wherein the lock bar 66 is disposed downwardly away from the upper tie bar 19 such that it is disposed in a tie-bar-receiving position where it is ready to be disposed in close proximity to the corresponding upper tie bar 19, and a locked position wherein the lock bar 66 pivots upwardly relative to the upper tie bar 19 such that at least a portion of the upper tie bar is disposed between the lock bar 66 and the lift support body 56. Accordingly, in some embodiments, for example, the tilt-impeding member 110 and the lock bar 66 of the carrier restraint system 64 serve to secure and/or position the stack mold carrier 10 to the platen assembly 12 of the injection molding machine.

While example embodiments of the stack mold carrier and restraint system have been described, it will be understood that certain adaptations and modifications of the described embodiments can be made. Therefore, the above discussed embodiments are considered to be illustrative and not restrictive.

What is claimed is:

1. A stack mold carrier for supporting a center mold section of an injection mold including a platen assembly of an injection molding machine, the stack mold carrier comprising:
   a carrier base for releasably coupling with the center mold section, wherein the carrier base is configured for displacement, relative to the platen assembly, along a machine axis;
      a linkage assembly pivotally connected to the carrier base and configured for pivotally connecting to a first platen and to a second platen of the platen assembly;
   a first restraint system for releasably retaining the linkage assembly in a fixed position relative to the carrier base, the first restraint system defining:
      a first condition, wherein the linkage assembly is fixed relative to the carrier base such that pivotal movement of the linkage assembly relative to the carrier base is prevented; and
      a second condition wherein the linkage assembly is disposed for pivotal movement relative to the carrier base and is operably coupled to the first and second platens and disposed for pivotal movement relative to the first and second platens; and
   a lift support body for releasably coupling with a lifting mechanism, the lift support body supporting the stack mold carrier when subjected to a lifting force via the lifting mechanism;
   wherein:
      while the first restraint system is disposed in the first condition, the stack mold carrier is disposed for installation on the platen assembly as an assembled unit.

2. The stack mold carrier as claimed in claim 1, further comprising:
   a second restraint system for releasably coupling the stack mold carrier relative to an upper tie bar of the platen assembly;
   wherein:
      the releasable coupling of the stack mold carrier relative to the upper tie bar by the second restraint system remains effective in the absence of coupling of the carrier base with the center mold section.

3. The stack mold carrier as claimed in claim 2, wherein:
   the releasable coupling of the stack mold carrier relative to the upper tie bar of the platen assembly is such that displacement of the stack mold carrier away from the upper tie bar of the platen assembly, along an axis transverse, or generally transverse, to the machine axis, is resisted.

4. The stack mold carrier as claimed in claim 1, wherein:
   the linkage assembly includes:
      a propeller bar pivotally connected to the carrier base;
      a first link arm pivotally connected to a first end of the propeller bar, the first link arm configured for operably coupling to the first platen such that the first link arm pivots relative to the first platen in response to displacement of the first platen, relative to the second platen, along the machine axis; and
      a second link arm pivotally connected to a second end of the propeller bar, the second link arm configured for operably coupling to the second platen such that the second link arm pivots relative to the second platen in response to displacement of the first platen, relative to the second platen, along the machine axis;
   wherein:
      displacement of the first platen relative to the second platen, along the machine axis, is such that the propeller bar pivots relative to the carrier base, the first link arm pivots relative to the first platen and relative to the propeller bar, and the second link arm pivots relative to the second platen and relative to the propeller bar.

5. The stack mold carrier of claim 4, wherein:
   the first restraint system includes:
      a first latch bar having a first end releasably connected to the first link arm and a second end releasably connected to the propeller bar, the first latch bar resisting displacement of the first link arm relative to the propeller bar;
      a second latch bar having a first end releasably connected to the second link arm and a second end releasably connected to the propeller bar, the second latch bar resisting displacement of the second link arm relative to the propeller bar; and
      a propeller restraint for releasably connecting the propeller bar to the mold support portion such that rotation of the propeller bar relative to the carrier base is resisted.

6. The stack mold carrier as claimed in claim 5, wherein:
   the platen assembly includes a pair of upper tie bars and a pair of lower tie bars extending between and interconnecting the first and second platens;
   and
   the second restraint system includes:
      a lock bar pivotally connected to the carrier base, wherein the lock bar is operable between:
         a tie-bar receiving position wherein the stack mold carrier is disposed for positioning proximal a corresponding one of the pair of upper tie bars of the platen assembly; and
         a locked condition wherein the lock bar is disposed for releasably retaining the corresponding upper tie bar between the lock bar and the carrier base;
   wherein:
      disposition of the lock bar in the locked condition is such that a clearance gap is disposed between the lock bar and the upper tie bar, and displacement of the stack mold carrier along the machine axis relative to the upper and lower tie bars is permitted, while displacement of the stack mold carrier away from the corresponding upper tie bar is impeded.

7. The stack mold carrier as claimed in claim 6, wherein:
   the second restraint system further comprises:
   a lower tie bar guide block releasably connected to the carrier base for releasably retaining a corresponding one of the pair of lower tie bars of the platen assembly between the lower tie bar guide block and the carrier base;
   wherein:
      the releasable connection of the lower tie bar guide block to the carrier base is such that at least a portion of the corresponding lower tie bar is disposed between the lower tie bar guide block and the carrier base and spaced apart therefrom such that displacement of the stack mold carrier along the machine axis relative to the upper and lower tie bars is permitted, while displacement of the stack mold carrier away from the corresponding lower tie bar is impeded.

8. The stack mold carrier as claimed in claim 1, wherein: the carrier base includes:
   a base portion for supporting the stack mold carrier on a machine guideway of the injection molding machine; and
   a mold support portion configured for releasably connecting to the center mold section; and
wherein the the mold support portion includes:
   a mold support bar mounted to the base portion, the mold support bar extending between respective first and second ends, the mold support bar including a center mold section connector configured for releasably connecting with the center mold section, the center mold section connector disposed between the first and second ends of the mold support bar.

9. The stack mold carrier as claimed in claim 8, wherein: the base portion includes at least one of the following alternatives: rollers, bearing pads, or adaptors for engaging and mounting the base portion to the machine guideway, for effecting displacement of the stack mold carrier along the machine guideway or linear bearing guideways in response to displacement of the first platen, relative to the second platen, along the machine axis.

10. The stack mold carrier as claimed in claim 8, wherein: the base portion includes bronze pads for engaging the machine guideway, the bronze pads disposed for effecting displacement of the stack mold carrier along the machine guideway in response to displacement of the first platen, relative to the second plate, along the machine axis.

11. The stack mold carrier as claimed in claim 4, further comprising:
   a mounting system for operably coupling and pivotally connecting the linkage assembly to the first and second platens;
wherein:
   the mounting system includes:
      a first mounting bracket for mounting to the first platen proximal one of the lower ties bars that extends from the first platen, the first mounting bracket defining a mounting surface for coupling with the first link arm of the linkage assembly; and
      a second mounting bracket for mounting to the second platen proximal the upper tie bar that extends from the first platen and interconnects the second platen and is disposed generally parallel to the lower tie bar associated with the first mounting bracket, the second mounting bracket defining a mounting surface for coupling with the second link arm of the linkage assembly.

12. The stack mold carrier as claimed in claim 1, further comprising:
   a tilt-impeding member coupled to the carrier base, the tilt-impeding member extending generally perpendicular to a vertical axis of the stack mold carrier such that the tilt-impeding member is disposed generally parallel to the upper tie bar when the stack mold carrier is disposed for operation relative to the platen assembly, the tilt-impeding member extending between first and second ends, each of the first and second ends including an upper tie-bar engaging portion configured for disposition proximal to at least a portion of the corresponding upper tie bar of the platen assembly, such that:
   while the stack mold carrier is disposed for operation relative to the platen assembly; and
   while the tilt-impeding member is disposed in close proximity to the portion of the upper tie bar, the tilt-impeding member impedes displacement of the stack mold carrier about an axis that extends generally transverse to the vertical axis of the stack mold carrier such that one of the first and second ends of the tilt-impeding member becomes disposed farther away from the corresponding upper tie bar than the other one of the first and second ends such that at least a portion of the carrier base is disposed upwardly away from and out of contact with the machine guideway.

13. The stack mold carrier as claimed in claim 12, wherein:
   the upper tie-bar engaging portion includes a friction-reducing member having a concave radius configured for disposition in close proximity to the portion of the upper tie bar; and
   wherein disposition of the stack mold carrier relative to the platen assembly such that the upper tie bar is disposed within the concave radius of each of the friction-reducing members of the tilt-impeding member, such that the upper tie bar is disposed in close proximity to but spaced apart from the friction-reducing members, is such that:
   displacement of the stack mold carrier along the upper tie bar along the machine axis is permitted while tilting of the stack mold carrier such that the at least a portion of the carrier base is disposed upwardly away from and out of contact with the machine guideway is prevented.

14. The stack mold carrier as claimed in claim 13, wherein:
   the disposition of the stack mold carrier relative to the platen assembly such that the upper tie bar is received within the concave radius of the friction-reducing member of the tilt-impeding member, such that it is in close proximity to but spaced away from the friction-reducing member, is such that impeding of the tilting of the stack mold carrier relative to the platen assembly such that the at least a portion of the carrier base is disposed upwardly away from and out of contact with the machine guideway is effected in the absence of releasable retaining of the stack mold carrier to the corresponding upper tie bar of the platen assembly via the second restraint system.

15. The stack mold carrier as claimed in claim 13, wherein:
   the friction-reducing member includes one of the following alternatives: brass bearing pads, Nylon bearing pads, and low friction alloy composites.

* * * * *

UNITED STATES PATENT AND TRADEMARK OFFICE
CERTIFICATE OF CORRECTION

| | | |
|---|---|---|
| PATENT NO. | : 12,330,359 B2 | Page 1 of 1 |
| APPLICATION NO. | : 17/774590 | |
| DATED | : June 17, 2025 | |
| INVENTOR(S) | : Vincenzo Ciccone and Petrica Maran | |

It is certified that error appears in the above-identified patent and that said Letters Patent is hereby corrected as shown below:

In the Claims

In Claim 8, Column 21, Line 11, the duplicated word "the" should be removed.

Signed and Sealed this
Nineteenth Day of August, 2025

Coke Morgan Stewart
*Acting Director of the United States Patent and Trademark Office*